(12) United States Patent
Tucker et al.

(10) Patent No.: US 11,662,649 B2
(45) Date of Patent: May 30, 2023

(54) CAMERA PRIVACY SHUTTE

(71) Applicant: Plantronics, Inc., Santa Cruz, CA (US)

(72) Inventors: Paul Tucker, Austin, TX (US); Greg George, Austin, TX (US); Alexander Baker Ekrut, Austin, TX (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 17/401,100

(22) Filed: Aug. 12, 2021

(65) Prior Publication Data
US 2023/0046244 A1  Feb. 16, 2023

(51) Int. Cl.
| | |
|---|---|
| G03B 9/08 | (2021.01) |
| G03B 9/40 | (2021.01) |
| G03B 19/22 | (2021.01) |
| H04N 23/90 | (2023.01) |
| G03B 11/04 | (2021.01) |
| H04N 23/73 | (2023.01) |

(52) U.S. Cl.
CPC ............... G03B 9/08 (2013.01); G03B 9/40 (2013.01); G03B 11/043 (2013.01); G03B 19/22 (2013.01); H04N 23/90 (2023.01); G03B 2207/00 (2013.01); H04N 23/73 (2023.01)

(58) Field of Classification Search
None
See application file for complete search history.

(56) References Cited

U.S. PATENT DOCUMENTS

| | | | |
|---|---|---|---|
| 7,324,748 B2 | 1/2008 | Abe | 396/55 |
| 2014/0198248 A1* | 7/2014 | Wernersson | G03B 9/38 |
| | | | 348/367 |
| 2020/0374432 A1 | 11/2020 | Cho et al. | |
| 2021/0033948 A1 | 2/2021 | Ushio et al. | |
| 2021/0149143 A1* | 5/2021 | Hu | G02B 7/08 |
| 2021/0223665 A1 | 7/2021 | Kuroki | |

FOREIGN PATENT DOCUMENTS

| | | | | |
|---|---|---|---|---|
| EP | 3736627 A1 | * | 11/2020 | ........... G03B 11/043 |
| EP | E P-3846142 A1 | * | 7/2021 | ....... G08B 13/19619 |
| KR | 10-2020-0133645 A | | 11/2020 | |

OTHER PUBLICATIONS

Logitech ViewPort AV 100 Installation, 16 pages, May 6, 2021.
https://www.arlo.com/en-us/cameras/essential/arlo-essential-indoor.html 9 pages, May 6, 2021.
https://www.electronichouse.com/home-security/myfox-home-security-cameras-protect-your-privacy/ 4 pages, May 6, 2021.
https://www.imagen-estilo.com/Articles/Flash/maximum-flash-sync-speed.html 4 pages, May 14, 2021.

* cited by examiner

Primary Examiner — Quan Pham
(74) Attorney, Agent, or Firm — Quarles & Brady LLP

(57) ABSTRACT

Embodiments of the present disclosure include an apparatus with a camera. A shutter is positioned horizontally in front of the lens of the camera. The shutter is configured to move in front of a lens of the camera and is further configured to move orthogonally to the horizontal axis so as to at least partially obscure the lens of first camera in a closed shutter position. The apparatus further includes a motor positioned horizontally behind the front of the lens of the camera. The motor is configured to move the shutter orthogonally to the horizontal axis between the closed shutter position and an open shutter position.

18 Claims, 21 Drawing Sheets

CAMERA PRIVACY SHUTTE

FIELD OF THE INVENTION

The present disclosure relates to cameras and videoconferencing equipment and, more particularly, to a privacy shutter for a camera.

BACKGROUND

Cameras, videoconferencing equipment, and other electronic devices that can visually record or provide visual interaction between users include a variety of mechanisms for privacy and to alert users of whether or not recording is occurring. Visual capture electronics may be turned off. Physical barriers may be used. Warning lights, such as a red light, or red blinking light, may be used to indicate that recording is occurring.

Inventors of embodiments of the present disclosure have discovered that many of these approaches are unreliable or confusing to users. Some devices may have a visual indicator that is not clearly visible to all users who may be recorded by the device. Devices with an indicator that recording is occurring may malfunction, and the device may actually be recording. Moreover, such devices may not have an affirmative indicator that recording is not occurring. In addition, physical barriers placed over cameras are fraught with problems, such as being placed at such a distance from the lenses of the cameras that the field of view is distorted. Moreover, placement of physical barriers closer to lenses is often not possible in other solutions given, for example, the placement of motors to drive the physical barriers. Inventors of embodiments of the present disclosure have investigated physical barrier solutions such as iris shutters, single sliding doors, rotating doors, eyelid or hemispherical shutters, miniblind style shutters, and curtain-style shutters, and have discovered that these approaches have shortcomings that make their incorporation into wide-camera lens applications unpractical.

SUMMARY

Embodiments of the present disclosure may include an apparatus. The apparatus may include one or more cameras, including a first camera and a second camera. The cameras may be implemented by any suitable camera. The cameras may be positioned one on top of the other. The apparatus may further include a first shutter. The first shutter may be positioned horizontally in front of a lens of the first camera and configured to move orthogonally to the horizontal axis so as to at least partially obscure the lens of the first camera in a closed first shutter position. The apparatus may include a first motor positioned horizontally behind the front of the lens of the first camera. The first motor may be implemented in any suitable manner, such as by a stepper motor. The first motor may be configured to move the first shutter orthogonally to the horizontal axis between the closed first shutter position and an open first shutter position.

Embodiments of the present disclosure may include an apparatus. The apparatus may include a first camera. The first camera may be of any suitable type. The apparatus may include a first shutter positioned horizontally in front of a lens of the first camera and may be configured to move orthogonally to the horizontal axis. The movement of the first shutter may be configured to at least partially obscure the lens of the first camera in a closed first shutter position, and to expose the lens of the first camera in an open first shutter position. The first shutter may include an open portion and a first solid portion. The open portion of the first shutter may be configured to expose the lens of the first camera in the open first shutter position. The first solid portion may be configured to obscure the lens of the first camera in the closed first shutter position.

Embodiments of the present disclosure may include an apparatus. The apparatus may include a first camera. The apparatus may include a first shutter positioned horizontally in front of a lens of the first camera. The first shutter may be configured to move orthogonally to the horizontal axis so as to partially obscure the lens of the first camera in a closed first shutter position. The apparatus may include a second shutter positioned horizontally in front of a lens of the first camera. The second shutter may be configured to move orthogonally to the horizontal axis so as to partially obscure the lens of the first camera in a closed second shutter position. The first shutter may include a first portion of a first visual indicator. The first visual indicator may be configured to externally indicate that the first camera is unable to capture visual data. The second shutter may include a second portion of the first visual indicator. When the first shutter is in the closed first shutter position and the second shutter is in the closed second shutter position, a combination of the first shutter and the second shutter may be configured to externally display the first visual indicator.

DETAILED DESCRIPTION

Figure 1A:
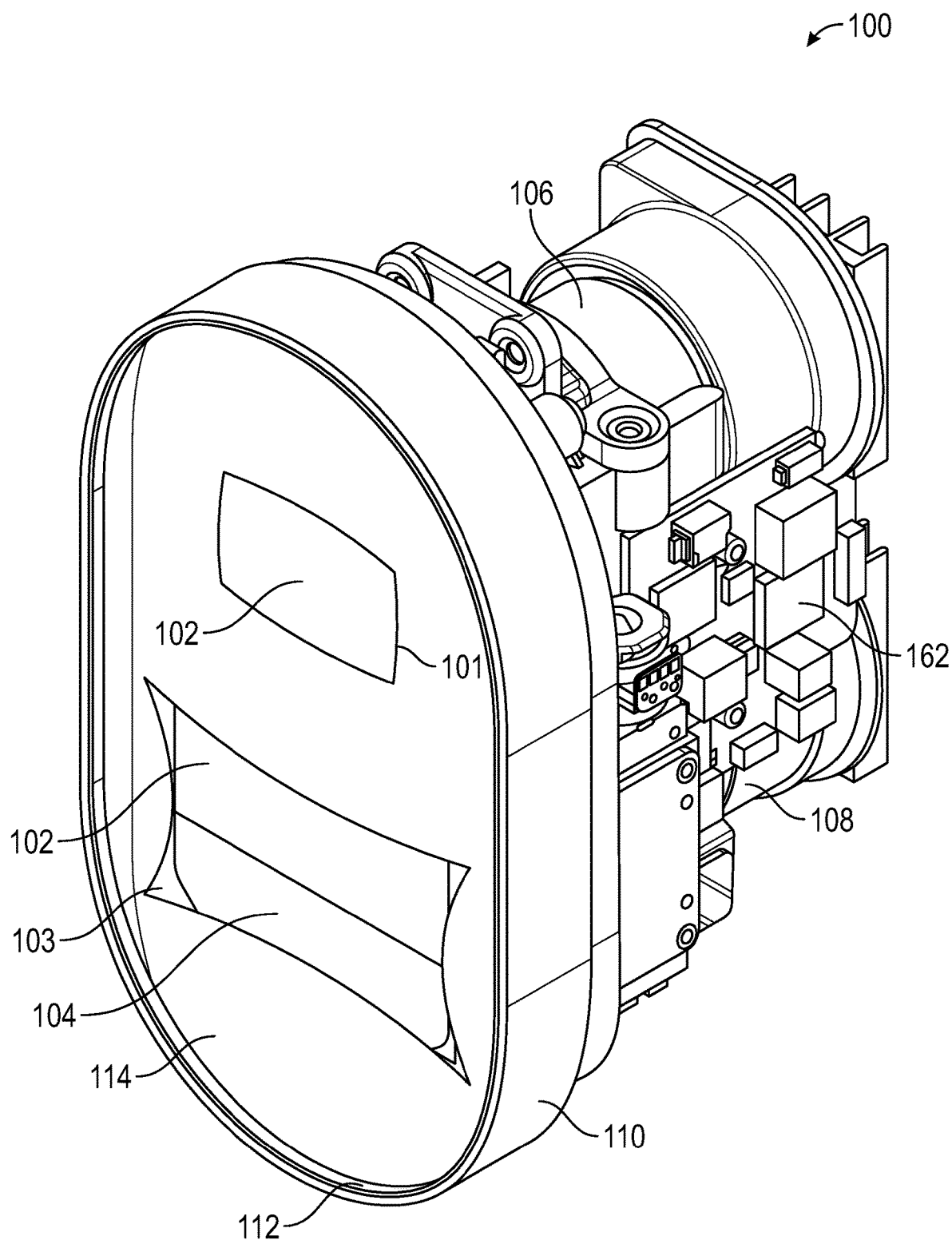
FIG. 1A is a front-facing isometric view of a system with sliding shutters that are in a closed position, according to embodiments of the present disclosure.

Embodiments of the present disclosure may include an apparatus. The apparatus may include one or more cameras, including a first camera and a second camera. The cameras may be implemented by any suitable camera. The cameras may be positioned one on top of the other. The apparatus may further include a first shutter. The first shutter may be positioned horizontally in front of a lens of the first camera and configured to move orthogonally to the horizontal axis so as to at least partially obscure the lens of the first camera in a closed first shutter position. The apparatus may include a first motor positioned horizontally behind the front of the lens of the first camera. The first motor may be implemented in any suitable manner, such as by a stepper motor. The first motor may be configured to move the first shutter orthogonally to the horizontal axis between the closed first shutter position and an open first shutter position.

In combination with any of the above embodiments, the apparatus may further include a second camera positioned orthogonally adjacent to the first camera. The second camera may be oriented in a same direction as the first camera. The first shutter may be further configured to obscure the lens of the first camera in the closed first shutter position and to partially obscure a lens of the second camera in the closed first shutter position.

In combination with any of the above embodiments, the apparatus may further include a second shutter positioned horizontally in front of a lens of the first camera. The second shutter may be configured to partially obscure the lens of the second camera in a closed second shutter position.

In combination with any of the above embodiments, a combination of the first shutter in the closed first shutter position and the second shutter in the closed second shutter position may be configured to obscure the lens of the second camera.

In combination with any of the above embodiments, the first shutter in the closed first shutter position and the second shutter in the closed second shutter position may overlap horizontally in front of the lens of the second camera.

In combination with any of the above embodiments, the apparatus may further include a second motor positioned horizontally behind the front of the lens of the first camera. The second motor may be configured to move the second shutter orthogonally to the horizontal plane between the closed second shutter position and a closed second shutter position.

In combination with any of the above embodiments, the first and second motors may be configured to be operated independently.

In combination with any of the above embodiments, the apparatus may further include a first motor gearing positioned behind the front of the lens of the first camera. The first motor gearing may be configured to, with the first motor, move the first shutter orthogonally to the horizontal plane between the closed first shutter position and the open first shutter position.

In combination with any of the above embodiments, the apparatus may further include a sensor positioned behind the front of the lens of the first camera. The sensor may be implemented in any suitable manner, such as by an optical sensor. The sensor may be configured to determine when the first shutter has reached the closed first shutter position.

In combination with any of the above embodiments, the apparatus may further include a slider coupled to the first shutter. The slider may be configured to extend horizontally to the rear of the first camera. The slider may include a protrusion configured to engage with a motor assembly at a location behind the front of the lens of the first camera. The protrusion may be the portion of the slider that extends horizontally towards the rear of the first camera.

Embodiments of the present disclosure may include an apparatus. The apparatus may be combined with any of the apparatuses of the above embodiments. In such a combination, the cameras and shutters of the apparatuses may be the same. The apparatus may include a first camera. The first camera may be of any suitable type. The apparatus may include a first shutter positioned horizontally in front of a lens of the first camera and may be configured to move orthogonally to the horizontal axis. The movement of the first shutter may be configured to at least partially obscure the lens of the first camera in a closed first shutter position, and to expose the lens of the first camera in an open first shutter position. The first shutter may include an open portion and a first solid portion. The open portion of the first shutter may be configured to expose the lens of the first camera in the open first shutter position. The first solid portion may be configured to obscure the lens of the first camera in the closed first shutter position.

In combination with any of the above embodiments, the apparatus may further include a second camera positioned orthogonally adjacent to the first camera and oriented in a same direction as the first camera. The first shutter may further include a second solid portion. The second solid portion may be configured to partially obscure the lens of the second camera in the closed first shutter position.

In combination with any of the above embodiments, the apparatus may further include a cover positioned horizontally in front of the first shutter. The cover may include a transparent layer and an opaque mask. The opaque mask may have a first opening. The first opening may be configured to expose the lens of the first camera. A combination of the first opening of the opaque mask and the open portion of the first shutter may be configured to expose the lens of the first camera in the open first shutter position.

In combination with any of the above embodiments, the open portion of the first shutter may be configured to be hidden behind the mask in the closed first shutter position.

In combination with any of the above embodiments, the first solid portion of the first shutter may be configured to be displayed through the first opening in the closed first shutter position.

In combination with any of the above embodiments, the first solid portion of the first shutter may be configured to be hidden behind the mask in the open first shutter position.

Embodiments of the present disclosure may include an apparatus. The apparatus may be combined with any of the apparatuses of the above embodiments. In such a combination, the cameras and shutters of the apparatuses may be the same. The apparatus may include a first camera. The apparatus may include a first shutter positioned horizontally in front of a lens of the first camera. The first shutter may be configured to move orthogonally to the horizontal axis so as to partially obscure the lens of the first camera in a closed first shutter position. The apparatus may include a second shutter positioned horizontally in front of a lens of the first camera. The second shutter may be configured to move orthogonally to the horizontal axis so as to partially obscure the lens of the first camera in a closed second shutter position. The first shutter may include a first portion of a first visual indicator. The first visual indicator may be configured to externally indicate that the first camera is unable to capture visual data. The second shutter may include a second portion of the first visual indicator. When the first shutter is in the closed first shutter position and the second shutter is in the closed second shutter position, a combination of the first shutter and the second shutter may be configured to externally display the first visual indicator.

In combination with any of the above embodiments, when the first shutter is in an open first shutter position and the second shutter is an open second shutter position, the first visual indicator is not displayed.

In combination with any of the above embodiments, the apparatus may further include a second camera positioned orthogonally adjacent to the first camera and oriented in a same direction as the first camera. The first shutter may further include a second visual indicator. The second visual indicator may be configured to externally indicate that the second camera is unable to capture visual data. The first shutter may be configured to obscure a lens of the second camera in the closed first shutter position. When the first shutter is in the closed first shutter position, the first shutter may be configured to externally display the second visual indicator.

Embodiments of the present disclosure may include an example system 100 with a camera privacy shutter, according to embodiments of the present disclosure. System 100 may be implemented within any suitable context, consumer device, or electronic device, such as in teleconferencing equipment, computers, mobile devices, servers, televisions, or other suitable applications.

In one embodiment, system 100 may include a single camera that is to be protected by a sliding shutter. In another embodiment, system 100 may include two cameras 106, 108 that are to be protected by two sliding shutters 102, 104.

Figure 1B:
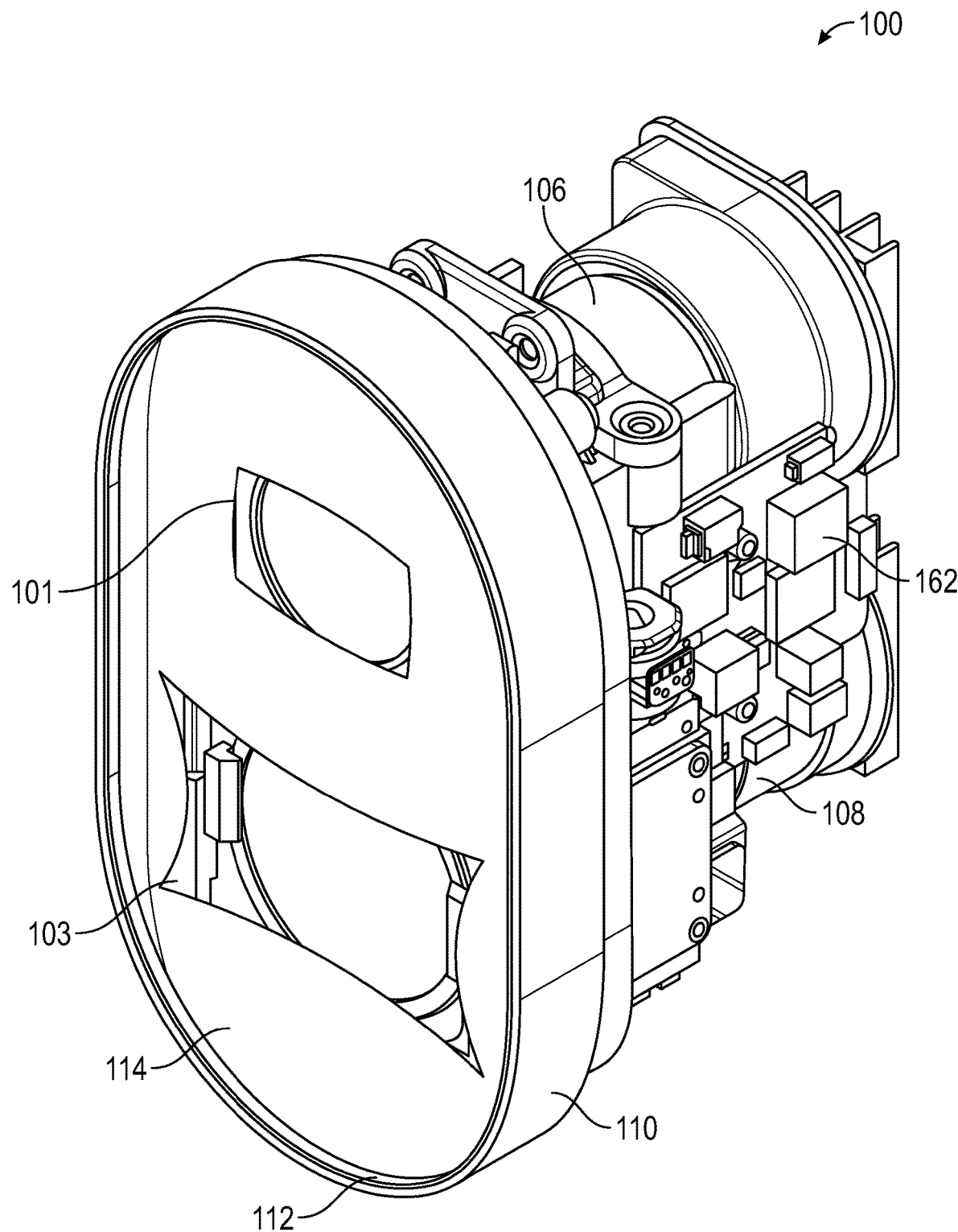
FIG. 1B is a front-facing isometric view of the system with sliding shutters that are in an open position, according to embodiments of the present disclosure.
Figure 1C:
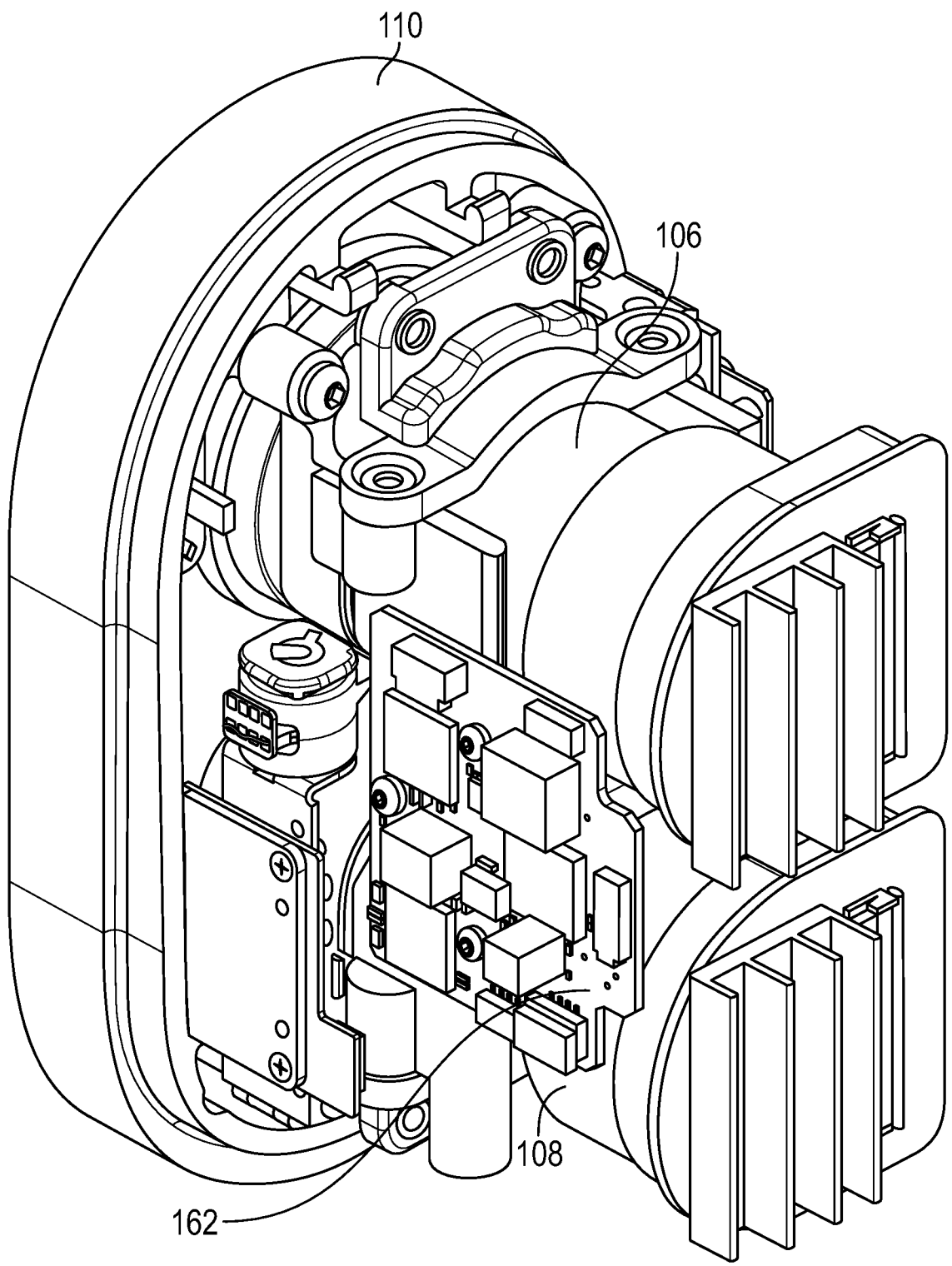
FIG. 1C is a right-side, rear-facing isometric view of the system, wherein positions of the sliding shutters are not shown, according to embodiments of the present disclosure.
Figure 1D:
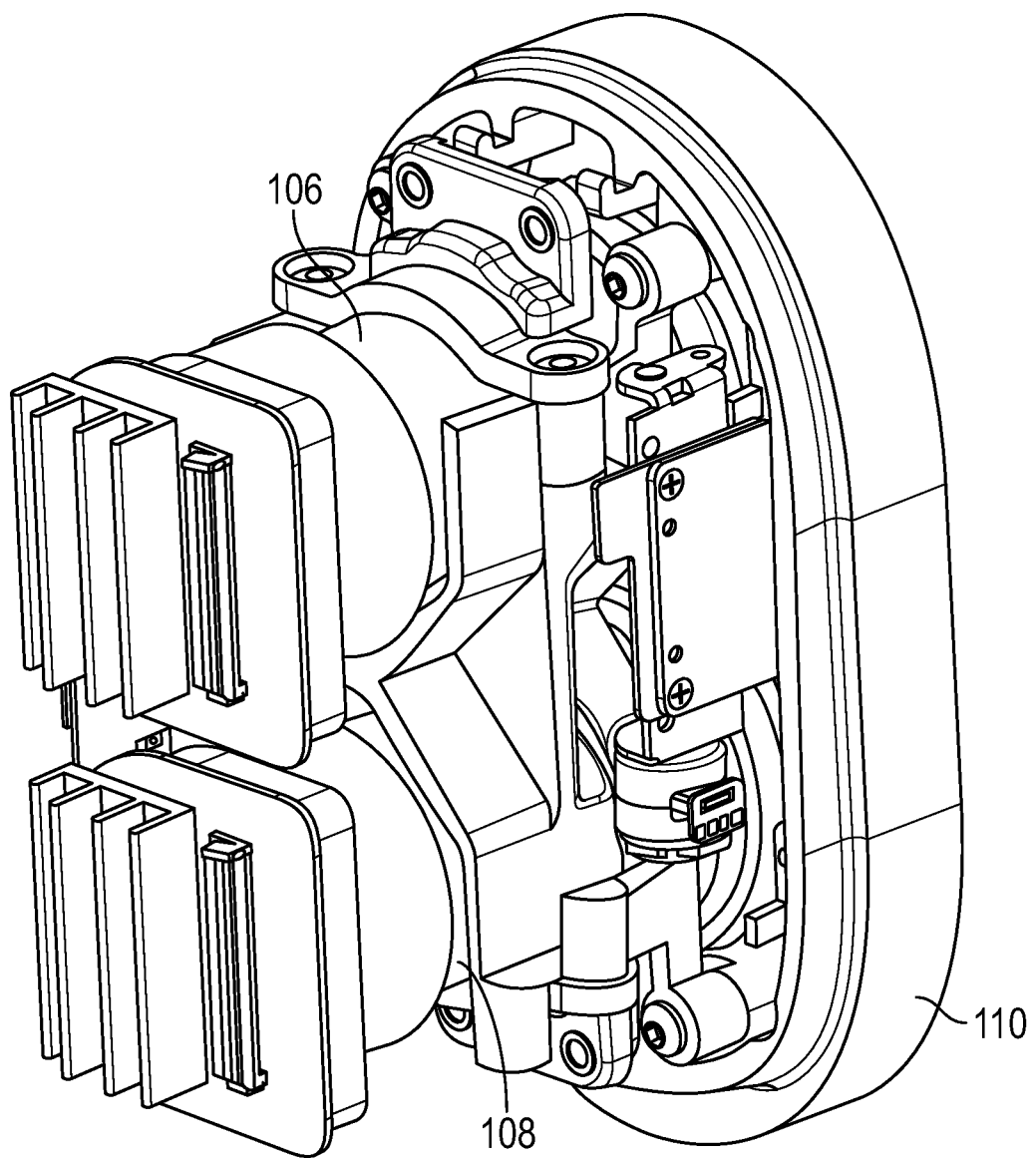
FIG. 1D is a left-side, rear-facing isometric view of the system, wherein positions of the sliding shutters are not shown, according to embodiments of the present disclosure.

FIG. 1A is a front-facing isometric view of system 100 with sliding shutters 102, 104 that are in a closed position, according to embodiments of the present disclosure. FIG. 1B is a front-facing isometric view of system 100 with sliding shutters 102, 104 that are in an open position, and thus not visible in FIG. 1B, according to embodiments of the present disclosure. FIG. 1C is a right-side, rear-facing isometric view of system 100, wherein positions of the sliding shutters 102, 104 are not shown, according to embodiments of the present disclosure. FIG. 1D is a left-side, rear-facing isometric view of system 100, wherein positions of the sliding shutters 102, 104 are not shown, according to embodiments of the present disclosure. In the figures of the present disclosure, system 100 is shown in a stripped form, wherein some external housings, support, wiring, communication, and other components might not be illustrated.

Shutters 102, 104 may be configured to be sliding shutters. Shutters 102, 104 may be configured to move vertically between an open position and a closed position. Shutters 102, 104 may be made from any suitable material, such as a thin metal.

System 100 may include two cameras, including top camera 106 and bottom camera 108. Top camera 106 may be configured to provide a focused view on a limited scope of the field of vision of system 100. For example, top camera 106 may focus on a single individual or another focal point within the field of vision of system 100. Bottom camera 108 may be configured to provide a wider view of the field of vision of system 100. Although these angles of view are provided as examples, system 100 may include any suitable variation or choices of angles of view for cameras 106, 108. Shutters 102, 104 may be configured to selectively obscure or block the visual access of cameras 106, 108.

System 100 may include a bezel 110. Bezel 110 may be configured to house shutters 102, 104. Moreover, bezel 110 may be configured to house a cover 112 and a mask 114. Cover 112 may be affixed on an exterior, front face of bezel 110. Cover 112 may be transparent and may be made of, for example, glass. Cover 112 may be the furthest, exterior component of system 100 towards the front of system 100. Mask 114 may be opaque and may be made from any suitable material. Mask 114 may obscure portions of the open lenses of cameras 106, 108. Mask 114 may include one or more openings 101, 103 to allow cameras 106, 108 to perceive the outside of system 100 towards the front of system 100. Shutters 102, 104 may be configured to selectively obscure openings 101, 103 and thus block the visual access of cameras 106, 108.

Any suitable number and kind of openings may be used in mask 114. In one embodiment, opening 101 may be configured to provide a narrow focus and field of vision for camera 106. In another embodiment, opening 103 may be configured to provide a wider view of the field of vision for camera 108. Opening 101 may be on top of opening 103.

In one embodiment, as shown in FIG. 1B, in the open position, shutter 102 may be raised and shutter 104 may be lowered. This may expose access to cameras 106, 108. In one embodiment, as shown in FIG. 1A, in the closed position, shutter 102 may be lowered and shutter 104 may be raised. This may obscure or block access to cameras 106, 108. In a further embodiment, in the closed position, shutter 102 may obscure camera 106. In yet a further embodiment, in the closed position, shutter 102 may completely obscure camera 106. In another, further embodiment, in the closed position, shutter 102 may also partially obscure camera 108. In yet another, further embodiment, in the closed position, shutter 104 may partially obscure camera 108. The combination of shutter 102 and shutter 104 in the closed position may fully obscure camera 108.

In various embodiments, the operation of shutters 102, 104 to obscure cameras 106, 108 may be made in conjunction with mask 114 and openings 101, 103. Openings 101, 103 may obscure portions of cameras 106, 108 that are not obscured by shutters 102, 104 in the closed position. Moreover, in the open position, mask 114 may obscure portions of cameras 106, 108 that are not obscured by shutters 102, 104 while the portions of cameras 106, 108 corresponding to openings 101, 103 may be exposed.

Operation of shutters 102, 104 may be controlled by a control circuit 162. Control circuit 162 may be implemented by analog circuitry, digital circuitry, instructions stored in a memory for execution by a processor, or any suitable combination thereof. Control circuit 162 may be configured to determine whether or not to open or close shutters 102, 104. Control circuit 162 may be configured to make such a determination upon any suitable criteria, such as upon user demand, upon an instruction from teleconferencing software, the pushing of a button on system 100 or on a remote control associated with system 100, upon startup of system 100, or upon shutdown of system 100. For example, upon startup of system 100 or shutdown of system 100, control circuit 162 may be configured to close shutters 102, 104. Upon initiation of a teleconferencing call, and upon further request from a user of system 100, control circuit 162 may be configured to open shutters 102, 104. Upon issuance of a visual-mute instruction, control circuit 162 may be configured to close shutters 102, 104. Upon release of such a visual-mute instruction, control circuit 162 may be configured to open shutters 102, 104. Upon termination of a teleconferencing call, or upon further request from a user of system 100, control circuit 162 may be configured to close shutters 102, 104.

Accordingly, shutters 102, 104 may function as a physical barrier that obscures cameras 106, 108 when shutters 102, 104 are in the closed position. Shutters 102, 104 may obscure cameras 106, 108 to provide privacy to users of system 100 who are within the field of vision of cameras 106, 108. Even if cameras 106, 108 were accidentally turned on, shutters 102, 104 may block visual access to the area in front of system 100. Moreover, shutters 102, 104 may provide a visual indicator to users of system 100 that cameras 106, 108 are unable to perceive the front of system 100. Thus, users may have a positive affirmation that privacy is protected against cameras 106, 108.

Figure 2:
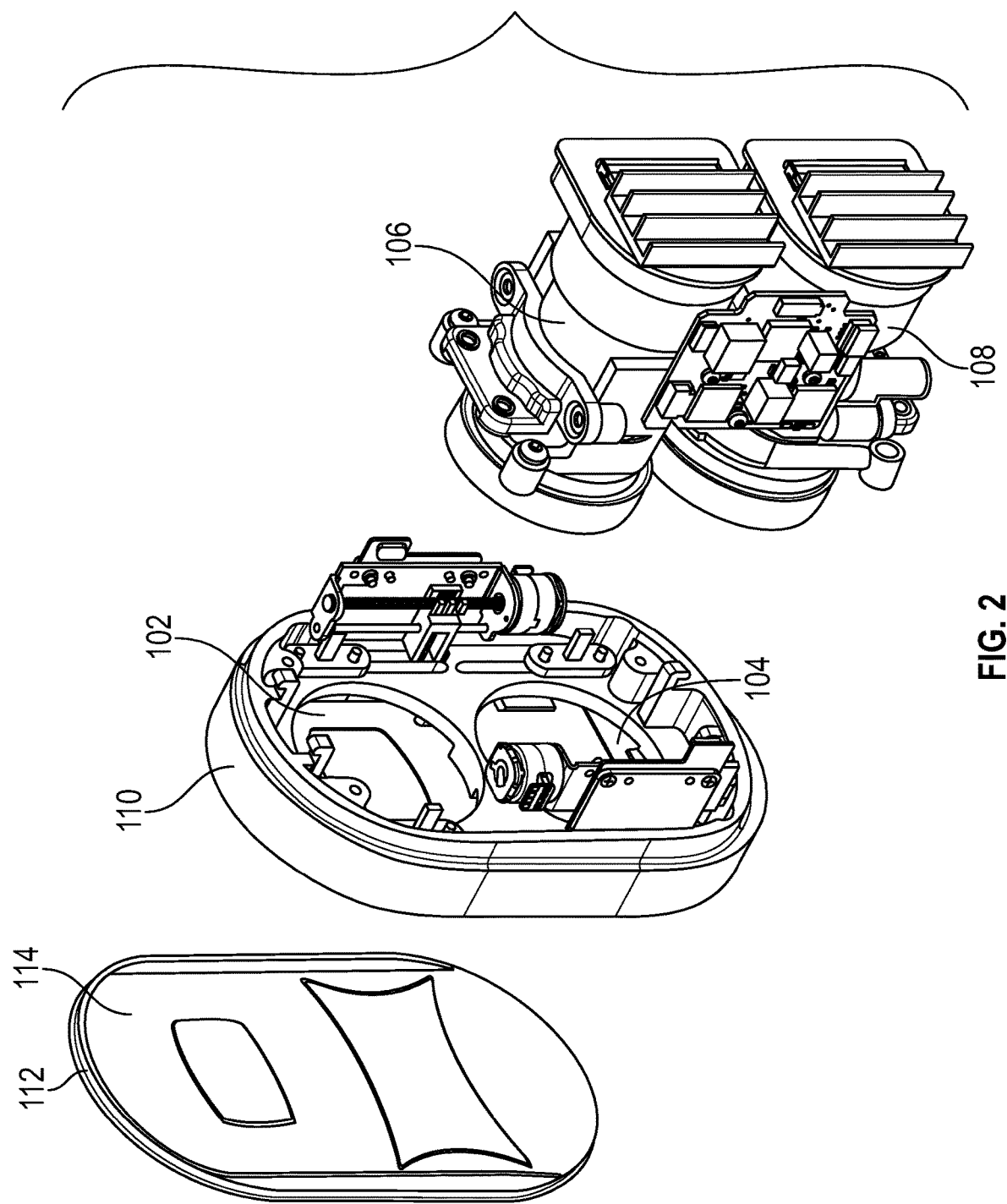
FIG. 2 is an exploded right-side, rear-facing isometric view of the system, according to embodiments of the present disclosure.

FIG. 2 is an exploded right-side, rear-facing isometric view of system 100, according to embodiments of the present disclosure. Shown in FIG. 2 are bezel 110, cameras 106, 108, and cover 112 separated. Also visible in FIG. 2 are shutters 102, 104 in an open position.

Figure 3A:
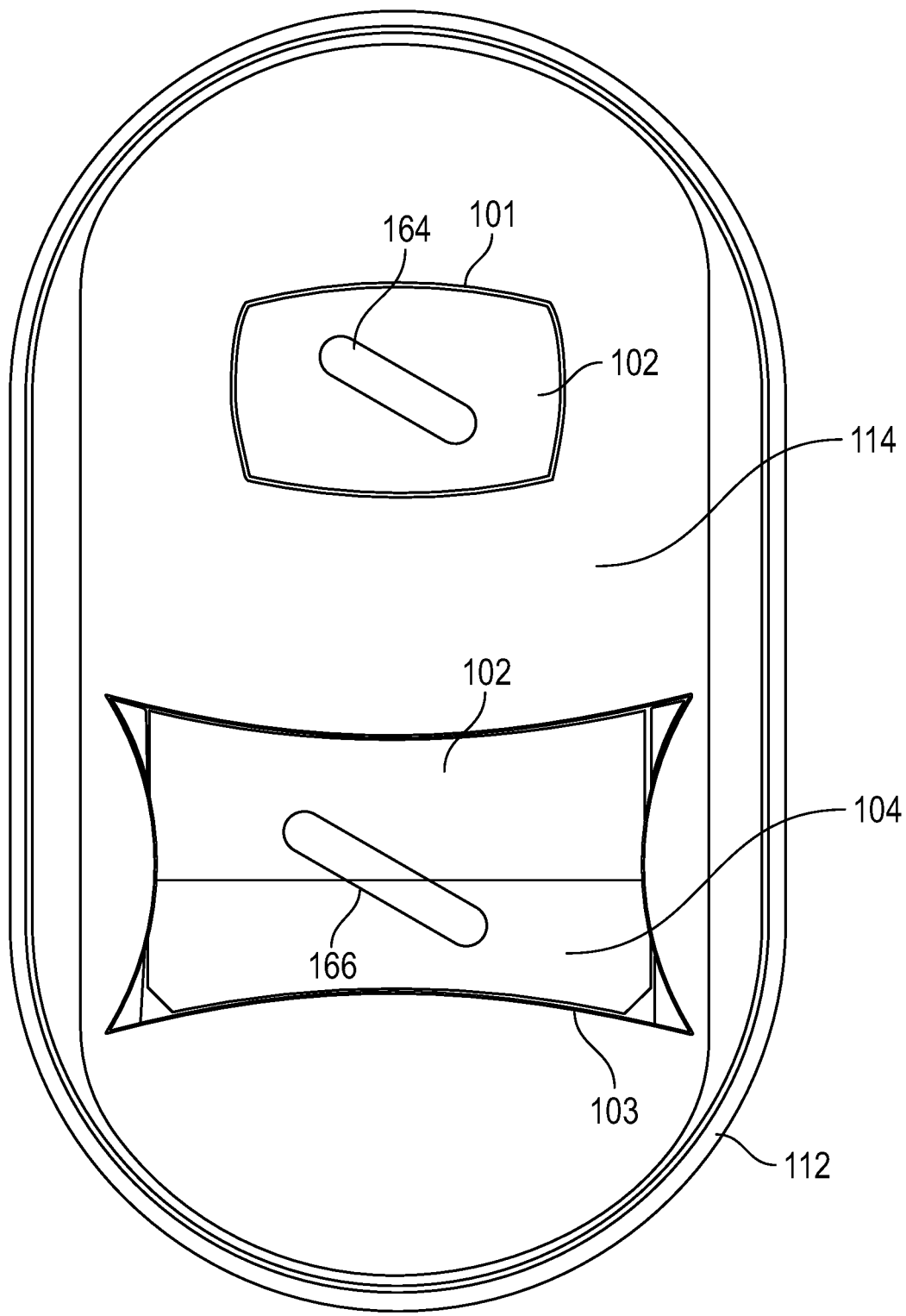
FIG. 3A is a front view of the system when the shutters are in a closed position, according to embodiments of the present disclosure.
Figure 3B:
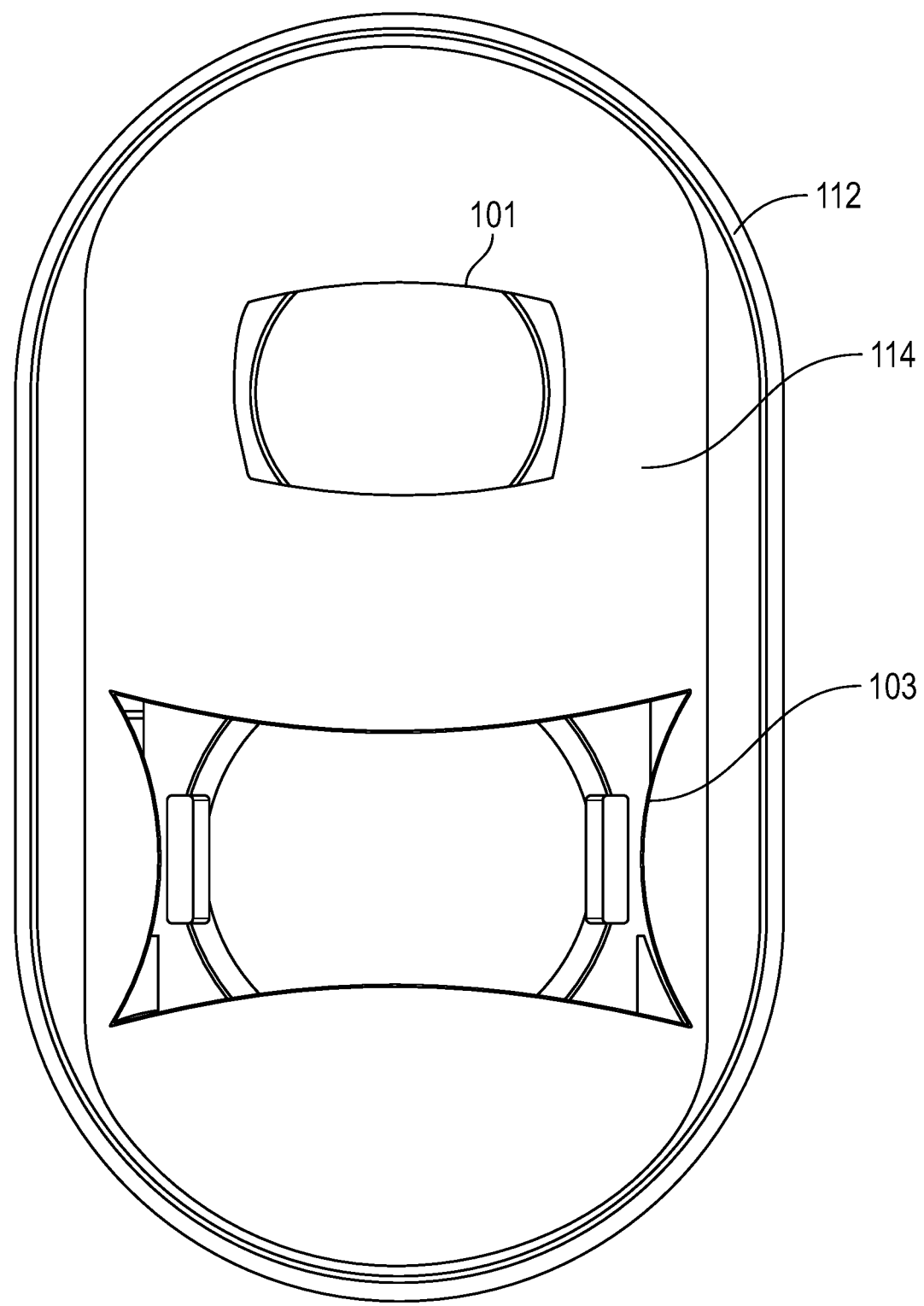
FIG. 3B is a front view of the system when the shutters are in an open position, according to embodiments of the present disclosure.

FIG. 3A is a front view of system 100 when shutters 102, 104 are in a closed position. FIG. 3B is a front view of system 100 when shutters 102, 104 are in an open position. As discussed above, openings 101, 103 defined in mask 114 may provide visual access to the exterior of system 100 for cameras 106, 108. In the closed position, shutter 102 may cover opening 101 and a portion of opening 103. In the closed position, shutter 104 may cover the portion of opening 103 not otherwise covered by shutter 102.

In various embodiments, shutters 102, 104 may have any suitable visual indicator that shutters 102, 104 are in an open position or a closed position. In one embodiment, shutters 102, 104 may be of a particular color so that when shutters 102, 104 are in a closed position, an observer of system 100, seeing the color of shutters 102, 104 through openings 101, 103, may perceive that shutters 102, 104 are in a closed position. If an observer of system 100 does not see the color of shutters 102, 104 through openings 101, 103, and instead sees the lenses of cameras 106, 108 (such as in FIG. 3B), then the observer may perceive that shutters 102, 104 are in an open position.

However, this visual indication of the open or closed position of shutters 102, 104 may rely upon an observer already knowing, or remembering, that the color of shutters 102, 104 is different than the appearance of lenses of cameras 106, 108. Many observers may not understand that the solid background provided by shutters 102, 104 in a closed position is an indication of anything at all. Moreover, often the lenses of cameras 106, 108 will appear to be a solid background; interior components or surfaces within the lenses are often not visible to an observer. The appearance of whatever is behind openings 101, 103 may be very similar whether shutters 102, 104 are in an open or closed position. This may happen even if shutters 102, 104 are colored in a different manner than the lenses of cameras 106, 108. Moreover, shutters 102, 104 in combination cover opening 103 in the closed position. Thus, if one of shutters 102, 104 malfunctions in its movement, the status of the position may be unclear to an observer.

In one embodiment, shutters 102, 104 may be configured to provide visual indicators 164, 166 that shutters 102, 104 are in a closed position. Any suitable visual indicator may be used to implement visual indicators 164, 166. In the example of FIG. 3A, visual indicators 164, 166 may be implemented by a diagonal line. The diagonal line may be a striking or unusual color within the context of the rest of system 100, such as red. Visual indicators 164, 166 may be displayed in the closed position and not displayed in the open position.

In one embodiment, visual indicator 164 may be placed entirely upon shutter 102. When shutter 102 is in the open position, visual indicator 164 may be hidden as shutter 102 moves up and is hidden behind mask 114. When shutter 102 is in the closed position, visual indicator 164 may be displayed through opening 101.

In one embodiment, visual indicator 166 may be displayed partially on shutter 102 and partially on shutter 104. When shutter 102 and shutter 104 are both in the closed position, the combination of the portions of visual indicator 166 may be displayed for observers to perceive through opening 103. When shutter 102 is in the open position, a portion of visual indicator 166 may be hidden as shutter 102 moves up and is hidden behind mask 114. When shutter 104 is in the open position, the other portions of visual indicator 166 may be hidden as shutter 104 moves down and is hidden behind mask 114.

Figure 4A:
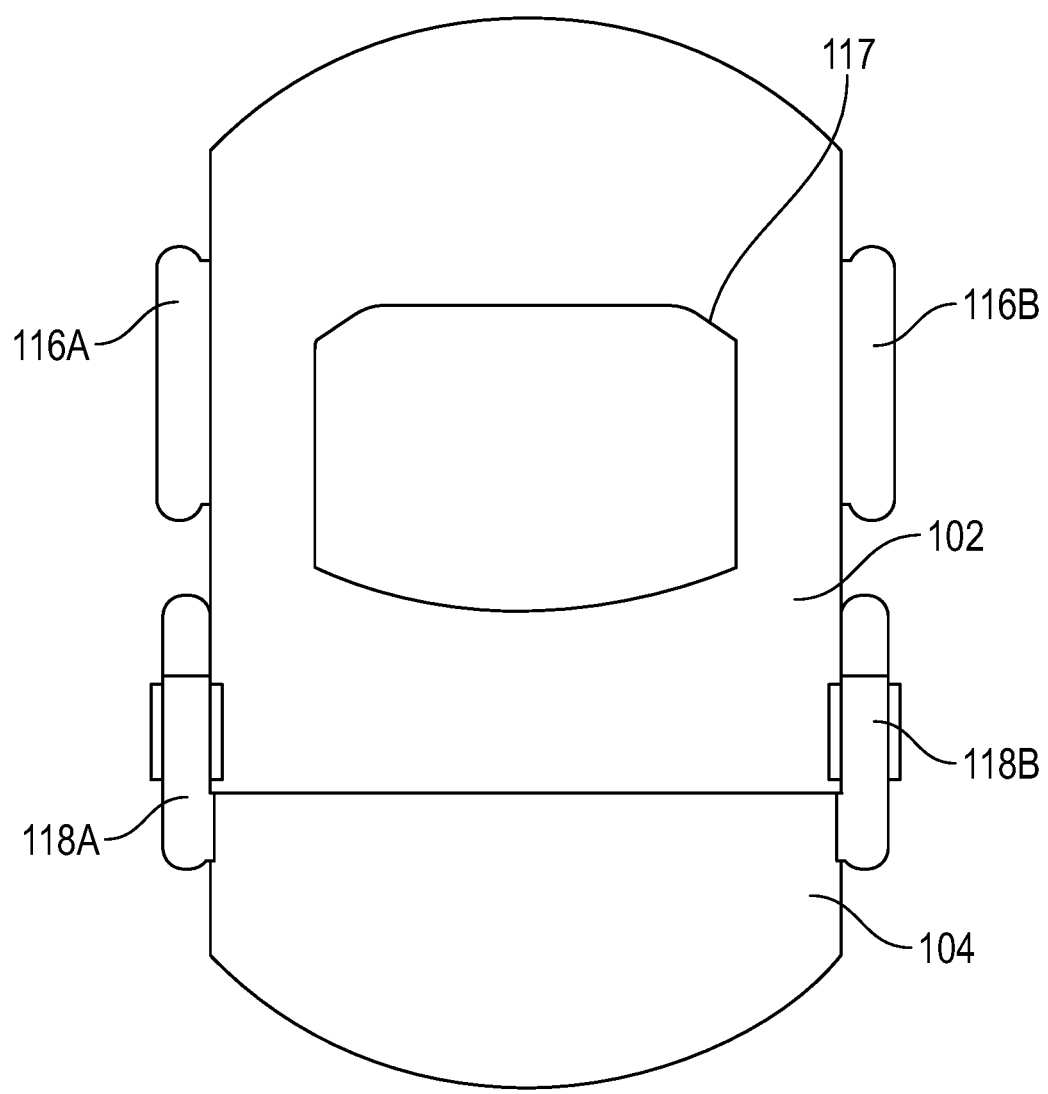
FIGS. 4A and 4B are views of shutter subassemblies, including the shutters, according to embodiments of the present disclosure
Figure 4B:
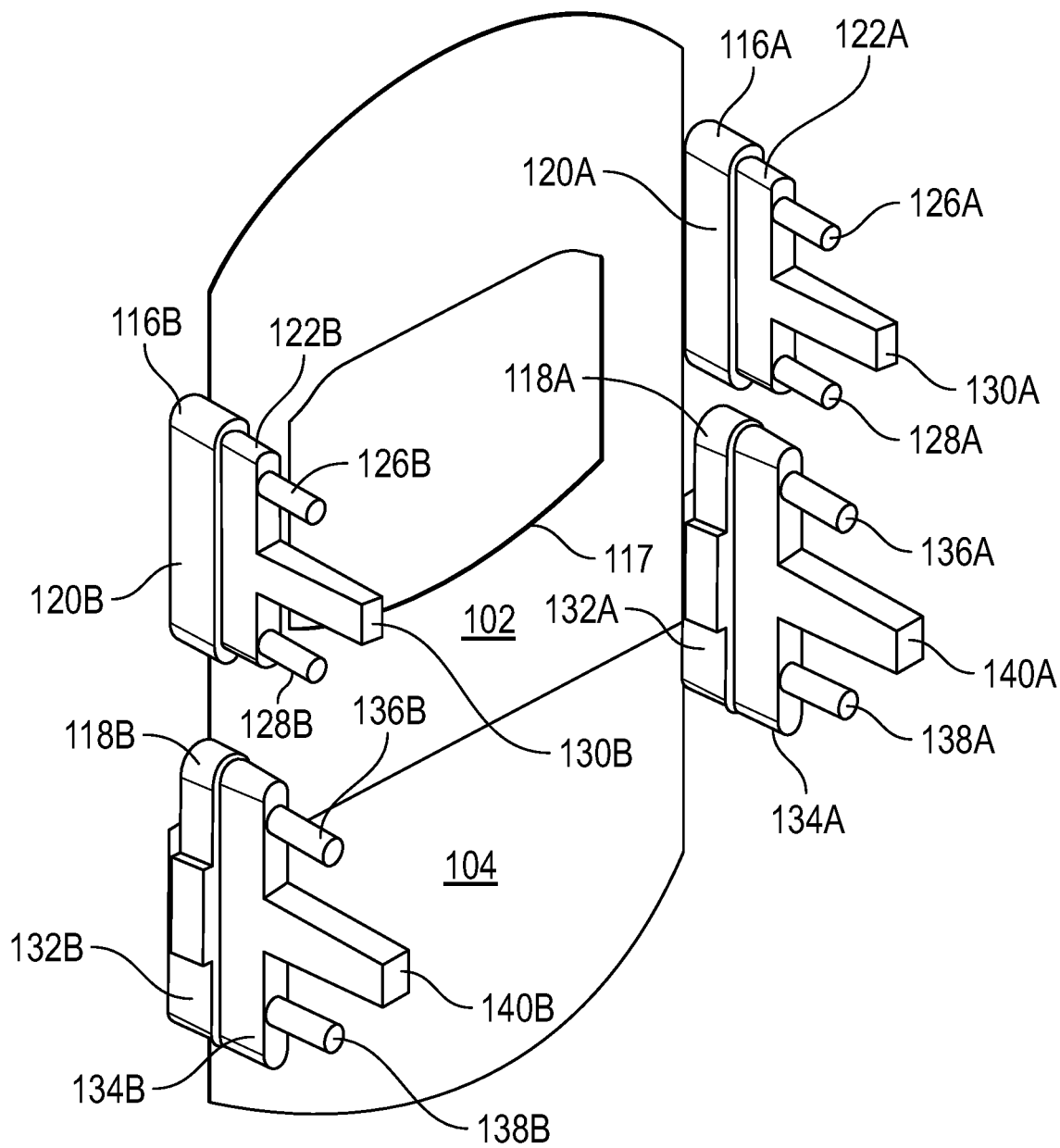

FIGS. 4A and 4B are views of shutter subassemblies, including shutters 102, 104, according to embodiments of the present disclosure. These may illustrate shutters 102, 104 without bezel 110.

Shutter 102 may include an opening 117. Opening 117 may be sized such that, in the open position, shutter 102 does not cover opening 101, but in the closed position, shutter 102 covers opening 101 and a portion of opening 103. Shutter 104 may be sized such that, in the open position, shutter 102 does not cover opening 103, but in the closed position, shutter 102 covers a portion of opening 103.

Sliders may be affixed to shutters 102, 104. Same or different sliders may be affixed to each of shutters 102, 104. For example, sliders 116A, 116B may be affixed to shutter 102. Sliders 118A, 118B may be affixed to shutter 104. Sliders 116, 118 may be affixed to shutters 102, 104 in any suitable manner. For example, sliders 116, 118 may be affixed to shutters 102, 104 through overmolding. Sliders 116, 118 may be molded from a suitable plastic. Sliders 116, 118 may be molded onto flanges, outcroppings, or other suitable portions of shutters 102, 104. In one example, sliders 116, 118 may extend rearwards from the front surface of shutters 102, 104. Sliders 116, 118 may be configured to be affixed to or otherwise engage with motors or motor assemblies to move shutters 102, 104 up and down. Sliders 116, 118 may be formed in any suitable shape to so engage motors to move shutters 102, 104 up and down.

For example, sliders 116 may each include a lower front base 122. Sliders 116 may each include a raised portion 126 protruding backward from the lower front base 122 towards the rear of system 100. Sliders 116 may each include three extrusions 126, 128, 130 protruding backward from the raised portion 126 towards the rear of system 100.

Similarly, sliders 118 may each include a lower front base 132. Sliders 118 may each include a raised portion 134 protruding backward from the lower front base 132 towards the rear of system 100. Sliders 118 may each include three extrusions 136, 138, 140 protruding backward from the raised portion 126 towards the rear of system 100.

Extrusions 126, 128 and extrusions 136, 138 may be configured to engage with backing plates that may affix sliders 116, 118 to bezel 110 in slots, so that shutters 102, 104 remain in a fixed horizontal position but are allowed to move vertically between open and closed positions. This is shown in more detail in FIGS. 6-7.

Extrusions 130, 140 may be configured to engage with motors that will be used to move shutters 102, 104 vertically between open and closed positions. This is shown in more detail in FIGS. 8-9.

The combination of shutters 102, 104 with respective sliders 116, 118, may comprise shutter subassemblies.

Figure 5A:
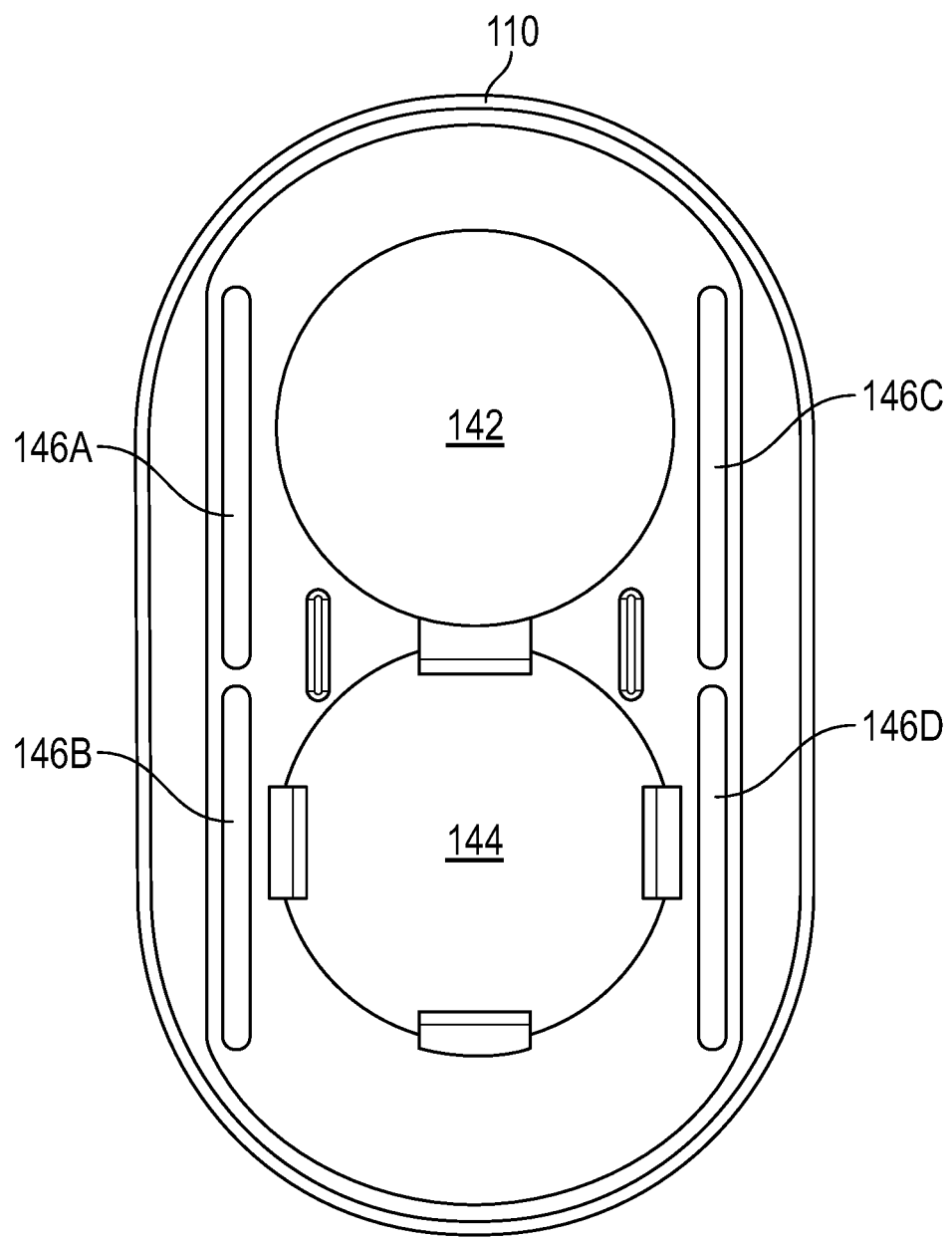
FIGS. 5A-5C illustrate a bezel, according to embodiments of the present disclosure.
Figure 5B:
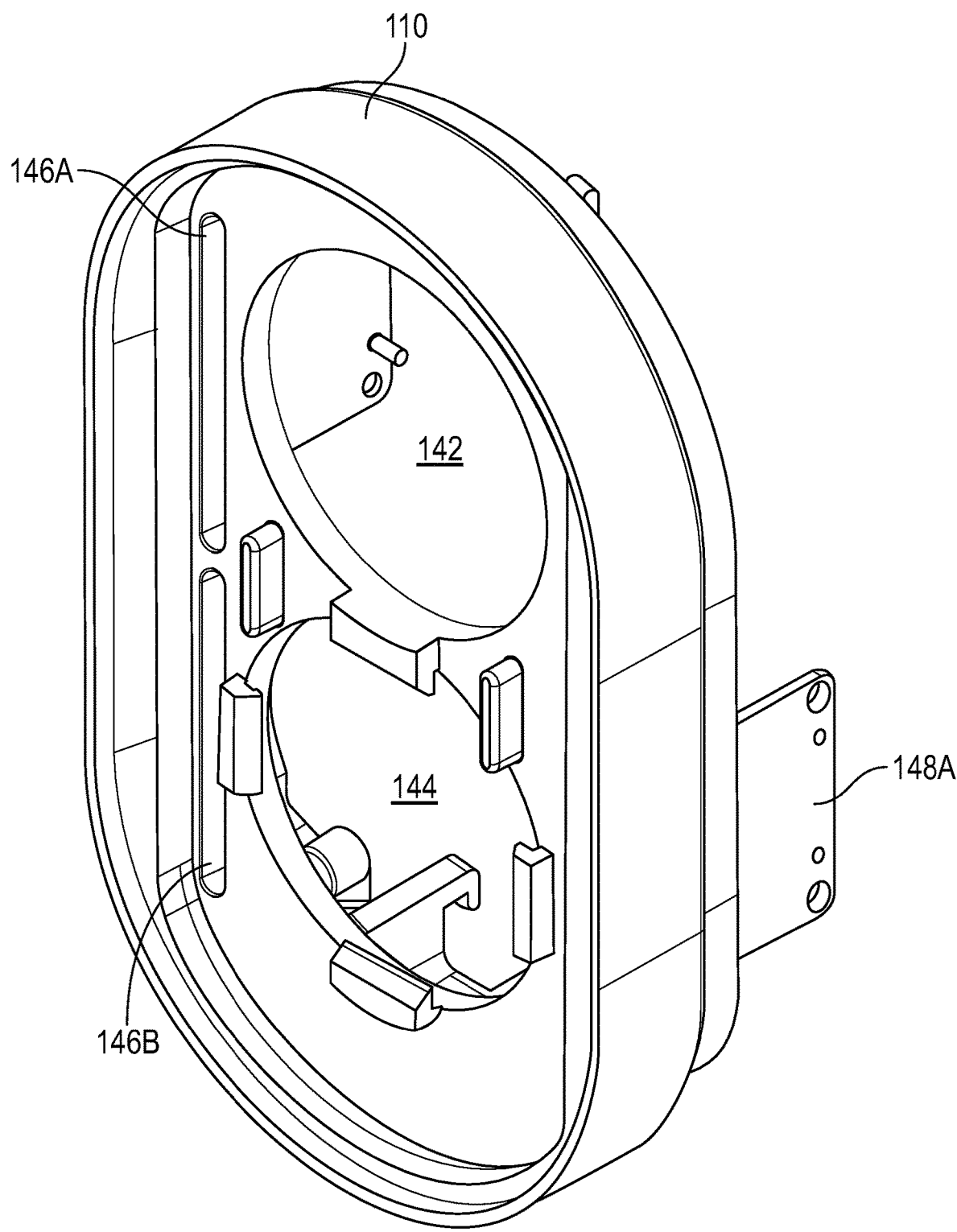
Figure 5C:
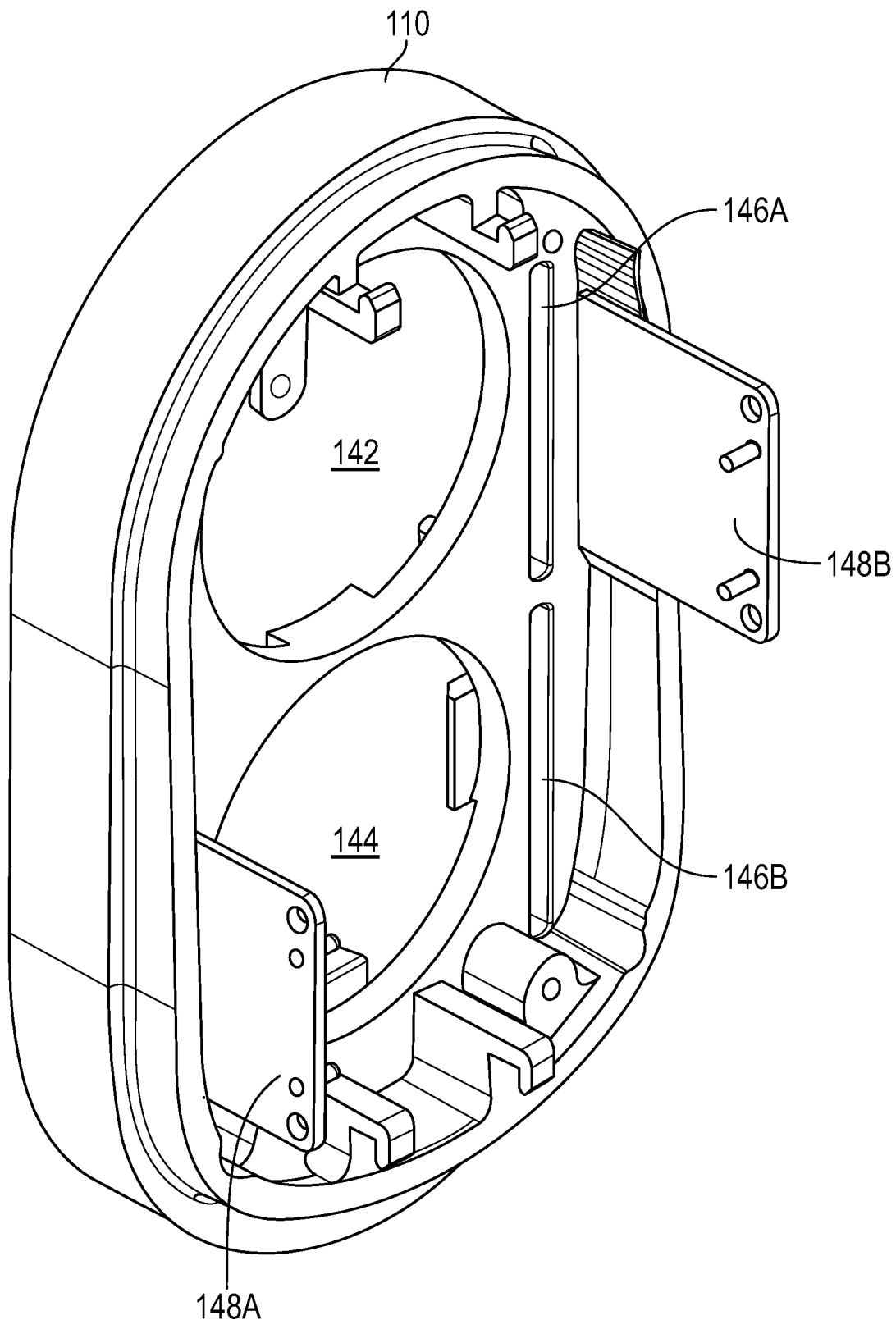

FIGS. 5A-5C illustrate bezel 110, according to embodiments of the present disclosure. FIGS. 5A-5C illustrate bezel 110 independent of other elements of system 100. FIG. 5A is a front view of bezel 110. FIG. 5B is a front-facing isometric view of bezel 110. FIG. 5C is a rear-facing isometric view of bezel 110.

Bezel 110 may include slots 146. Slots 146 may be configured to accept insertion of sliders 116, 118, and thus position the combination of shutters 102, 104 with overmolded sliders 116, 118. Slots 146 may be wide enough to allow insertion of sliders 116, 118, and may be tall enough to allow shutters 102, 104 to move between open and closed positions.

Bezel 110 may include openings 142, 144. Opening 142 may be configured to provide visual access to camera 106. Opening 144 may be configured to provide visual access to camera 108. Bezel 110 may include tabs 148, protruding towards the rear of system 100 from the rear of bezel 110. Tab 148A may be positioned on a right side of bezel 110 and tab 148B may be positioned on a left side of bezel 110. Tab 148A may be positioned adjacent to opening 144 on the bottom half of bezel 110 and tab 148B may be positioned adjacent to opening 142 on the top half of bezel 110. Tabs 148 may be configured to provide mounting for motors and sensors for the operation of shutters 102, 104.

Figure 6A:
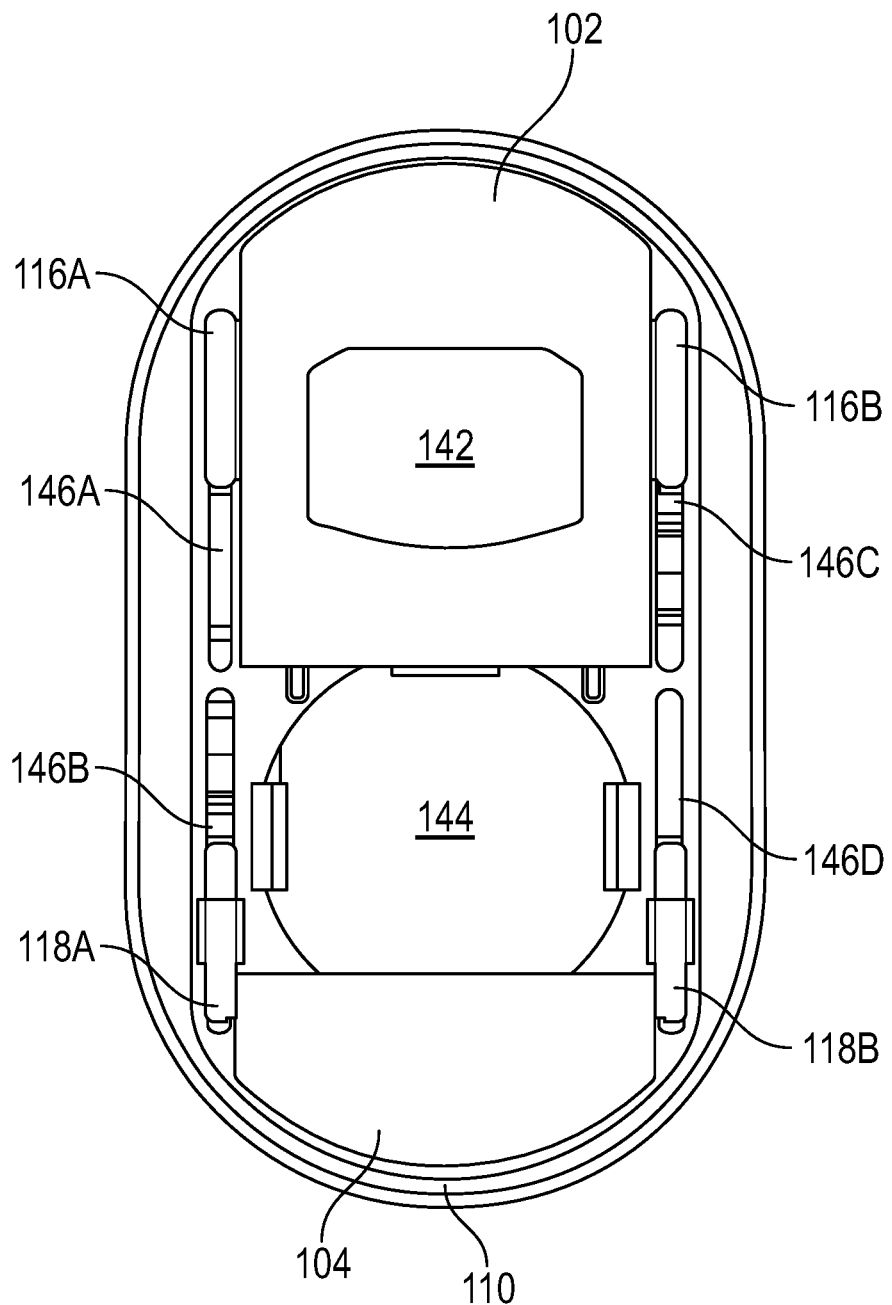
FIGS. 6A and 6B illustrate a front view of a combination of the shutters and bezel, according to embodiments of the present disclosure.
Figure 6B:
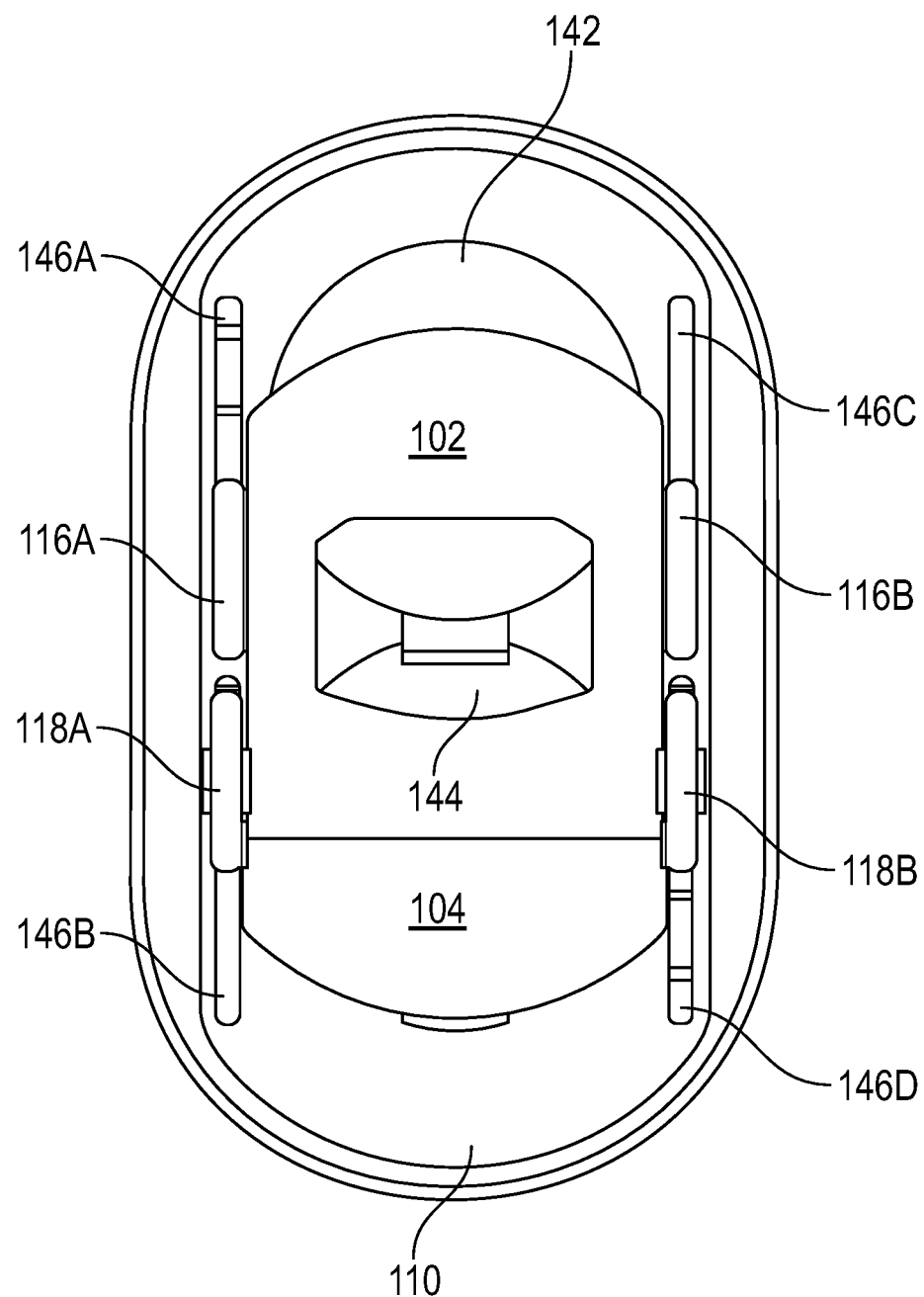

FIGS. 6A and 6B illustrate a front view of a combination of shutters 102, 104 and bezel 110, according to embodiments of the present disclosure. FIG. 6A is a front view of this combination of elements when shutters 102, 104 are in an open position. FIG. 6B is a front view of this combination of elements when shutters 102, 104 are in a closed position. Slider 116A may be inserted through slot 146A. Slider 116B may be inserted through slot 146C. Thus, shutter 102 may be affixed to bezel 110 through sliders 116. Slider 118A may be inserted through slot 146B. Slider 118B may be inserted through slot 146D. Thus, shutter 104 may be affixed to bezel 110 through sliders 118.

In FIG. 6A, sliders 116 may be at a relatively high vertical position within the allowable vertical range provided by slots 146A, 146C. Thus, shutter 102 may be in an open position. Sliders 118 may be at a relatively low vertical position within the allowable vertical range provided by slots 146B, 146D. Thus, shutter 104 may be in an open position.

As shown in FIG. 6B, sliders 116 may be at a relatively low vertical position within the allowable vertical range provided by slots 146A, 146C. Thus, shutter 102 may be in a closed position. Sliders 118 may be at a relatively high vertical position within the allowable vertical range provided by slots 146B, 146D. Thus, shutter 104 may be in a closed position.

In the open position, shutter 102 may expose more of opening 142 than is strictly necessary for opening 101 of mask 114 to be completely unobscured. In the open position, shutter 102 may expose more of opening 144 than is strictly necessary for opening 103 of mask 114 to be completely unobscured. Similarly, in the open position, shutter 104 may expose more of opening 144 than is strictly necessary for opening 103 of mask 114 to be completely unobscured.

Moreover, in the closed position, shutter 102 may obscure more of opening 142 than is strictly necessary to obscure opening 101 of mask 114, while leaving some portions of opening 142 unobscured. However, these unobscured portions of opening 142 may be obscured instead by mask 114. In the closed position, shutter 102 may obscure more of opening 144 than is strictly necessary to obscure opening 103 of mask 114, while leaving some portions of opening 144 unobscured. Similarly, in the closed position, shutter 104 may obscure more of opening 144 than is strictly necessary to obscure opening 103 of mask 114.

Figure 7A:
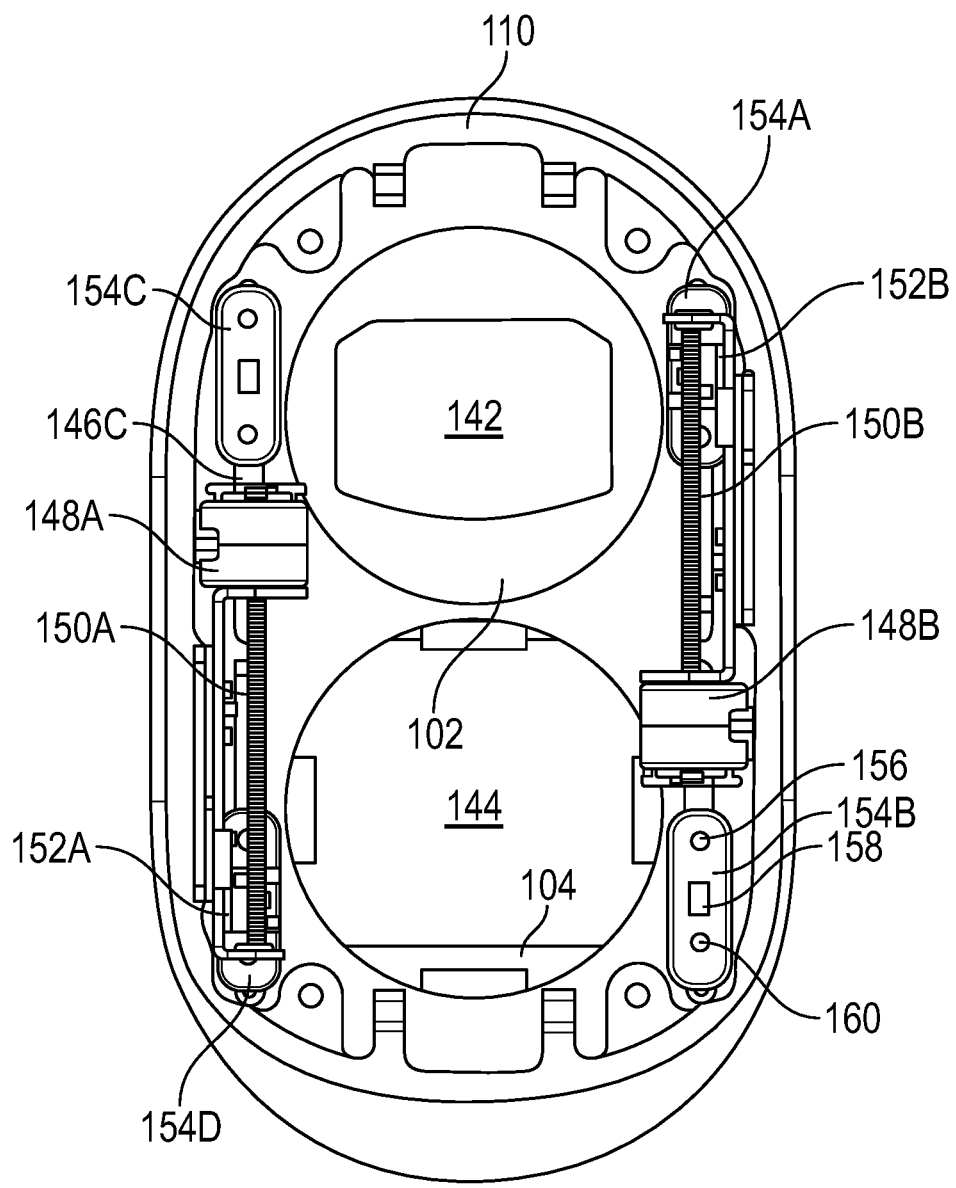
FIGS. 7A and 7B illustrate a rear view of a combination of the shutters and the bezel, according to embodiments of the present disclosure.
Figure 7B:
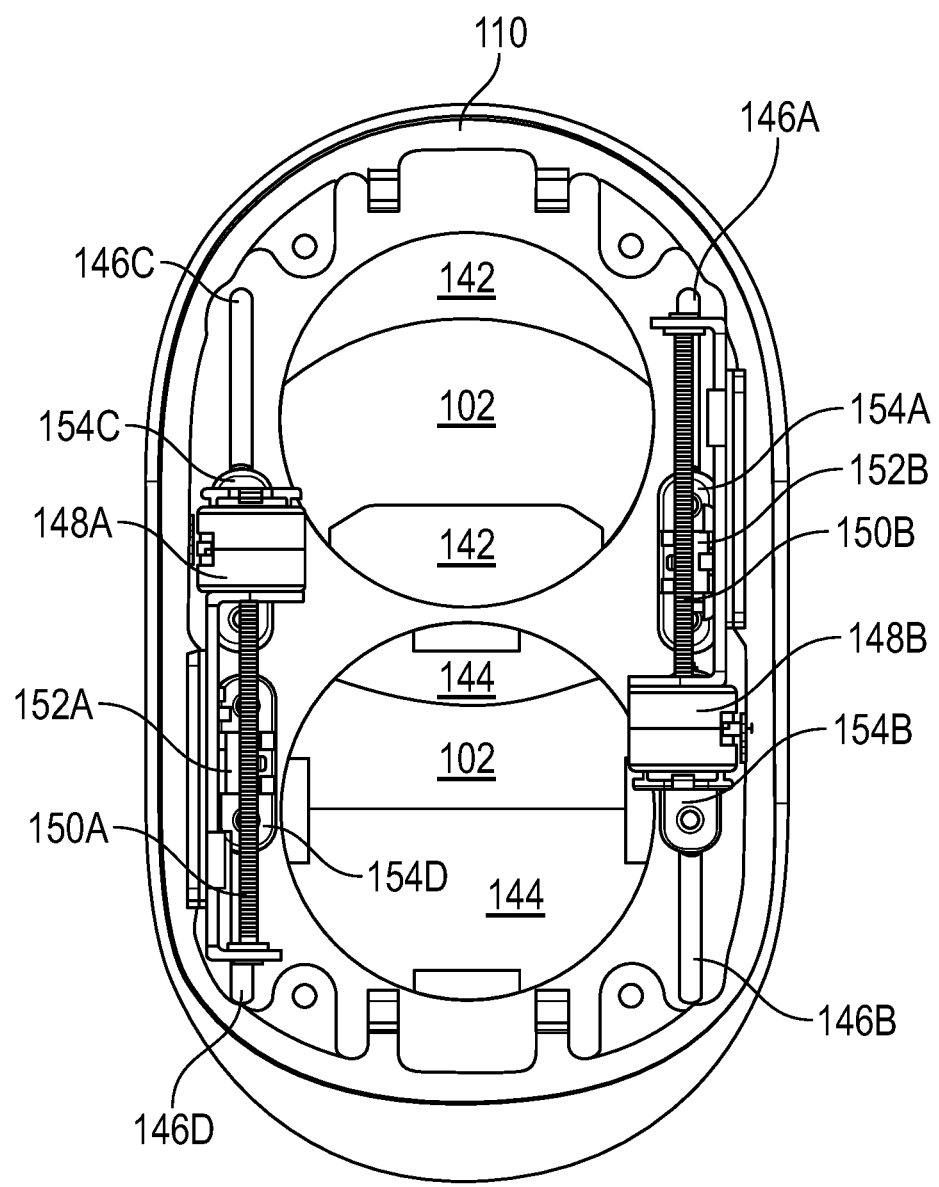

FIGS. 7A and 7B illustrate a rear view of a combination of shutters 102, 104 and bezel 110, according to embodiments of the present disclosure. FIG. 7A is a rear view of this combination of elements when shutters 102, 104 are in an open position. FIG. 7B is a rear view of this combination of elements when shutters 102, 104 are in a closed position. Just as discussed in FIGS. 6A-6B, slider 116A may be inserted through slot 146A. Slider 116B may be inserted through slot 146C. Thus, shutter 102 may be affixed to bezel 110 through sliders 116. Slider 118A may be inserted through slot 146B. Slider 118B may be inserted through slot 146D. Thus, shutter 104 may be affixed to bezel 110 through sliders 118. The positions of sliders 116, 118 in slots 146 in the respective open and closed positions may correspond to the descriptions of FIGS. 6A-6B.

FIGS. 7A and 7B may illustrate the way sliders 116, 118, and thus shutters 102, 104, are affixed to bezel 110. Any suitable manner of affixing sliders 116, 118 to bezel 110 may be used. In one embodiment, sliders 116, 118 may be affixed to bezel 110 by backing plates 154.

Backing plates 154 may include one or more openings 156, 158, 160 to accept portions of sliders 116, 118. The portions of sliders 116, 118 may protrude from the front of bezel 110 through slots 146 towards the rear of system 100. Backing plates 154 may engage with these portions of sliders 116, 118 on the rear of bezel 110. Backing plates 154 may be heat-staked, glued, screwed, or otherwise affixed to these portions of sliders 116, 118. Backing plates 154 may engage with these portions of sliders 116, 118 with sufficient tightness to prevent excessive wiggle or movement in the horizontal direction, while still allowing movement in the vertical direction as shutters 102, 104 move between open and closed positions.

For example, openings 156 may engage with extrusions 126 of sliders 116 and extrusions 136 of sliders 118. Openings 160 may engage with extrusions 128 of sliders 116 and extrusions 138 of sliders 118. Openings 158 may engage with extrusions 130 of sliders 116 and extrusions 140 of sliders 118.

Sliders 116, 118 may include any suitable number and size of extrusions, such as extrusions 126, 136, 128, 138, 130, 140. In one embodiment, one or more of extrusions 126, 128, 130 may be longer than the other extrusions on a given slider 116. For example, extrusion 130 may be longer than extrusions 126, 128. Similarly, one or more of extrusions 136, 138, 140 may be longer than the other extrusions on a given slider 118. For example, extrusion 140 may be longer than extrusions 136, 138.

In one embodiment, one or more of the extrusions on a given slider may be also configured to engage with motor assemblies of system 100. For example, the longer of the extrusions 126, 136, 128, 138, 130, 140 may be configured to engage with motor assemblies of system 100. Specifically, extrusion 130A on slider 116A, extrusion 130B on slider 116B, extrusion 140A on slider 118A, and extrusion 140B on slider 118B may be longer than the other extrusions to engage with motor assemblies of system 100. By engaging with such motor assemblies, the sliders may be moved vertically up and down, and thus shutters 102, 104 may be moved between open and closed positions.

Also illustrated in FIGS. 7A and 7B are motor assemblies. Any suitable number and kind of motor assemblies or motors may be included in system 100. For example, separate linear-screw stepper motors may be used to control shutters 102, 104. A motor sub-assembly including a stepper motor 148A, a linear-screw 150A, and a carriage nut 152A may be installed on the right, rear side of bezel 110 and configured to operate shutter 104. A motor sub-assembly including a stepper motor 148B, a linear-screw 150B, and a carriage nut 152B may be installed on the left, rear side of bezel 110 and configured to operate shutter 102. Although a carriage nut is used, any suitable mechanism, such as a C-shaped clamp, may be used. Carriage nuts 152 may be integrated onto stepper motor 148 assemblies and may engage or fit respective slider 116, 118 protrusions. Carriage nuts 152 may include a molded sensor flag or tab activate optical sensors.

Stepper motors 148 may be configured to be communicatively coupled to control circuit 162 and, based upon control signals received therefrom, raise or lower shutters 102, 104. Stepper motors 148 may be configured to raise or lower carriage nuts 152 as carriage nuts 152 traverse the length of linear-screws 150. Stepper motors 148 may be configured to operate independently of each other. Stepper motors 148 may cause carriage nuts 152 to traverse the length of linear-screws 150 until carriage nuts 152 reach a near or distal end of linear-screws 150. The length of travel of carriage nuts 152 may be defined by sensors, discussed in more detail below. When raising or lowering a shutter 102, 104, stepper motors 148 may cause carriage nuts 152 to travel to the opposite end of linear-screws 150 until a sensor is reached, indicating the end of the traversal and arrival at the open or closed position for the shutter.

Carriage nuts 152 may engage protrusions 130, 140 of sliders 116, 118 in any suitable manner. Carriage nuts 152 may include an opening sufficient for protrusions 130, 140 to partially enter into carriage nut 152. Moreover, carriage nuts 152 may include contact portions on the top and bottom of protrusions 130, 140 to engage protrusions 130, 140 to move sliders 116, 118 up and down. For example, carriage nuts 152 may be implemented as a U-shaped bracket. A front portion of carriage nuts 152 may be open so as to accept insertion of protrusions 130, 140. A top and bottom portion of carriage nuts 152 may be solid and in contact with protrusions 130, 140. A rear and side portion of carriage nuts 152 may be closed as necessary to engage with linear-screw 150 or may be open.

Figure 8A:
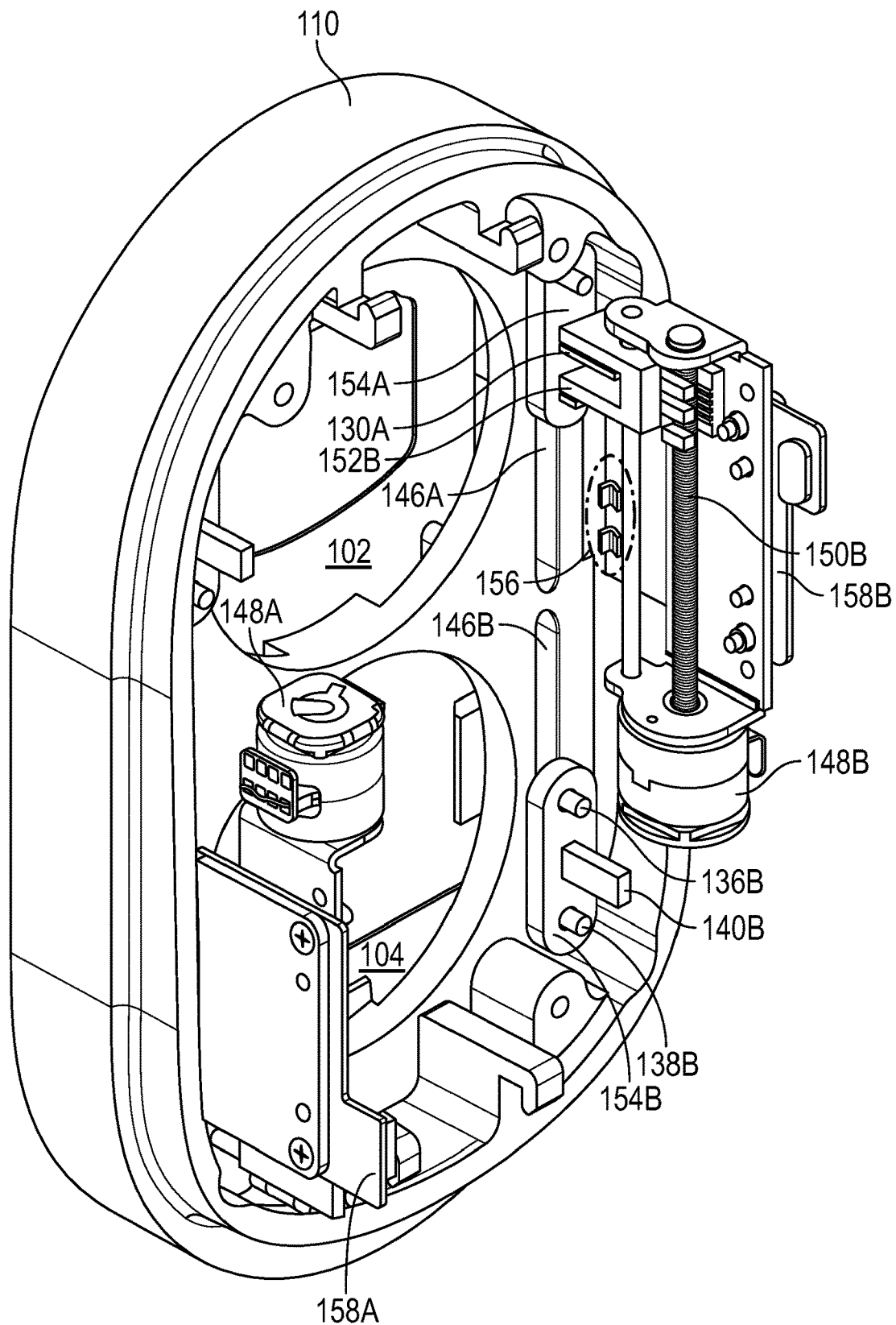
FIGS. 8A and 8B illustrate further views of the system that show example sensors and sensor boards, according to embodiments of the present disclosure.
Figure 8B:
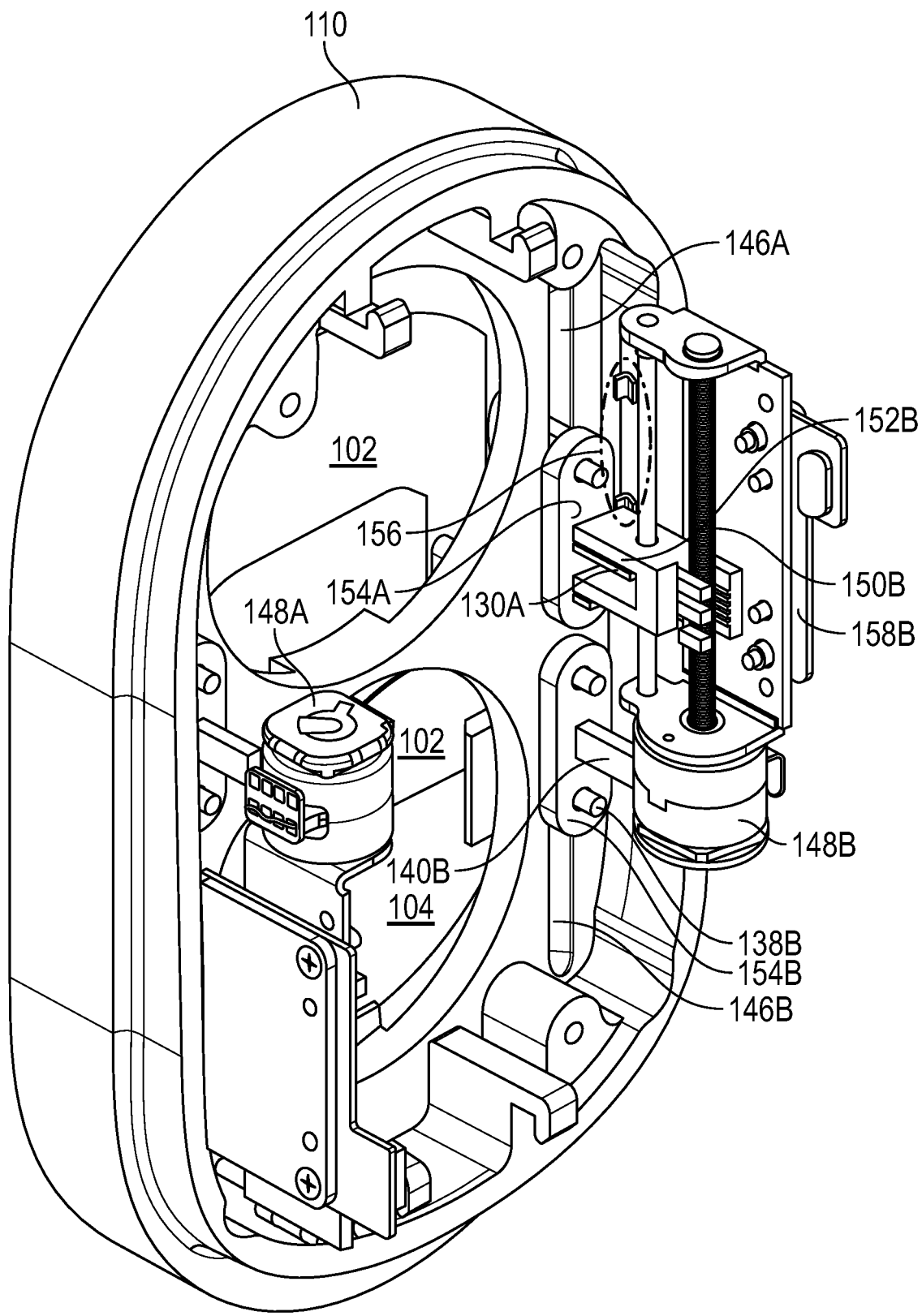

FIGS. 8A and 8B illustrate further views of system 100 that show example sensors 156 and sensor boards 158, according to embodiments of the present disclosure. Moreover, the U-shaped bracket implementation of carriage nuts 152 is illustrated. FIG. 8A is a rear-facing isometric view of system 100 wherein shutters 102, 104 are in an open position, while FIG. 8B is a rear-facing isometric view of system 100 wherein shutters 102, 104 are in a closed position, Any suitable number of sensors 156 may be mounted on sensor boards 158A, 158B. Sensors 156 may be implemented in any suitable manner, such as by optical sensors. When a given carriage nut 152 reaches a given sensor 156, a signal may be sent to control circuit 162, and further movement of carriage nut 152 along linear-screw 150 may be halted by motor 148.

For example, in FIG. 8A, wherein shutters 102, 104 are in an open position, carriage nut 152B may be engaged with protrusion 130A of slider 116A and may be at a top of slot 146A. Motor 148B may receive a control signal from control circuit 162 to move shutter 102 to an open position. Motor 148B may initiate movement of carriage nut 152B down the length of linear screw 150B, thus moving slider 116 down slot 146A and moving shutter 102 towards the closed position. Sensors 156 may detect when carriage nut 152B reaches a closed position. In FIG. 8B, carriage nut 152B may have reached the closed position, and slider 116 may be at the bottom of slot 146A.

Figure 9:
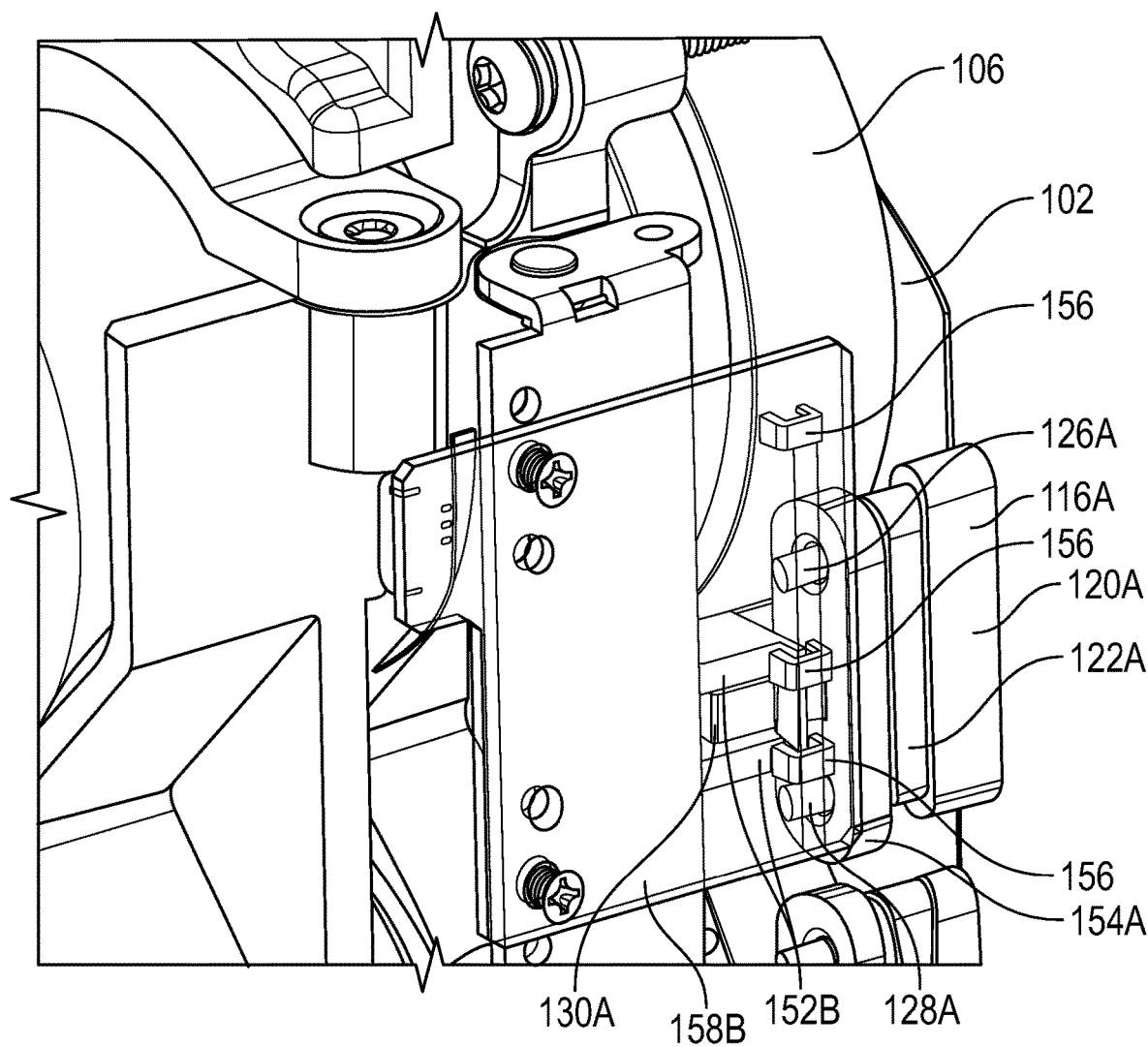
FIG. 9 is a more detailed view of the engagement of a carriage nut with a protrusion of a slider in relation to sensors, according to embodiments of the present disclosure.

FIG. 9 is a more detailed view of the engagement of carriage nut 152B with protrusion 130A of slider 116A in relation to sensors 156, according to embodiments of the present disclosure. FIG. 9 may represent a left-side rear-facing isometric view of system 100.

As shown, carriage nut 152B may have reached a bottom one of sensors 156, and thus stopped in the closed position. Sensor board 158B is shown semi-transparently.

Notably, a front lens or apex of a front lens of camera 106 is positioned further towards the front of system 100 than are several other components. In one embodiment, a front edge of slider 116A may be flush with shutter 102. The other portions of slider 116A may be implemented towards the rear of system 100. As a result, in one embodiment slider 116A may be engaged with carriage nut 152B at a position to the rear of the apex of a front lens of camera 106. In another embodiment, motor 148B may be installed at a position to the rear of the apex of a front lens of camera 106. In yet another embodiment, sensors 156 may be installed at a position to the rear of the apex of a front lens of camera 106. In still yet another embodiment, linear-screw 150B may be installed at a position to the rear of the apex of a front lens of camera 106. In another embodiment, shutter 102 may be affixed to bezel 110 at a position to the rear of the apex of a front lens of camera 106. Similar positioning may exist for the other shutter, sliders, motors, sensors, and carriage nuts.

Figure 10A:
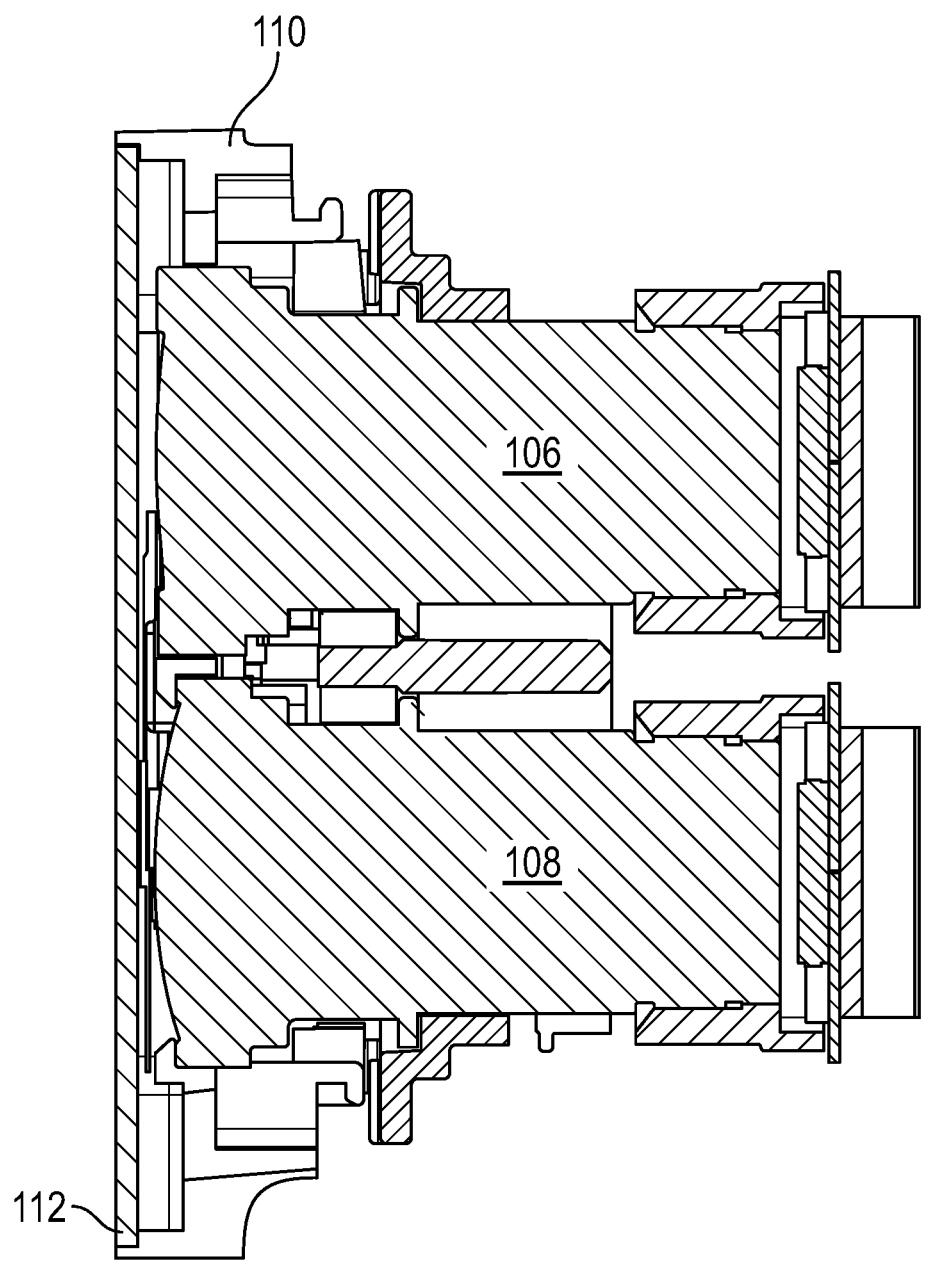
FIGS. 10A and 10B illustrate side views of the system illustrating example distances and placement of elements of the system, according to embodiments of the present disclosure.
Figure 10B:
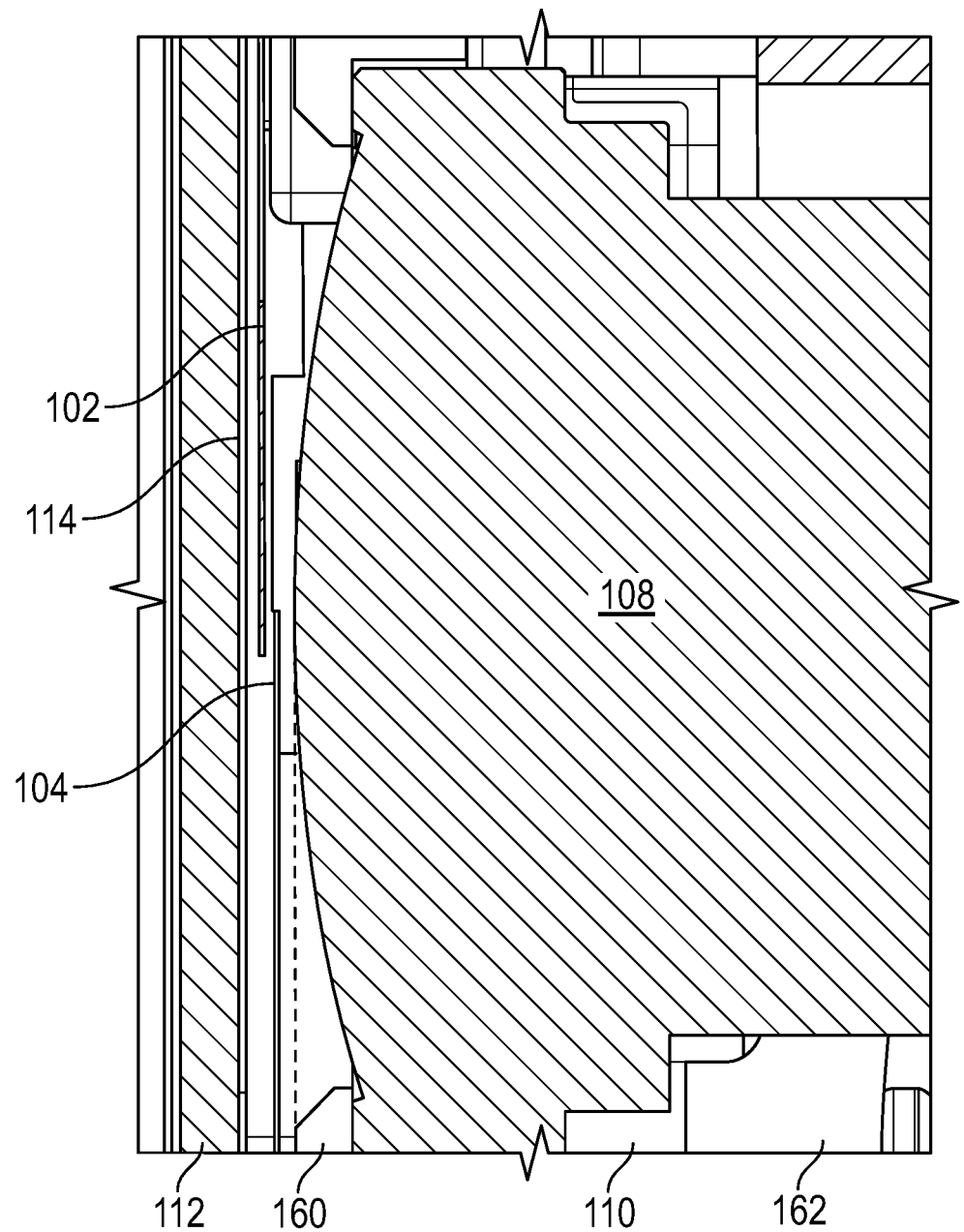

FIGS. 10A and 10B illustrate a side view of system 100 illustrating example distances and placement of elements of system 100, according to embodiments of the present disclosure. FIG. 10A is a right-side, cross-sectional view of system 100, and FIG. 10B is a zoomed-in view of portions of FIG. 10A.

As shown in FIG. 10A, cover 112 may be placed towards the front of system 100 from cameras 106, 108. Cover 112 may be included within bezel 110. The relatively small size of other components, such as shutters 102, 108, may cause these components to be less visible in FIG. 10A.

However, these are shown in greater detail in FIG. 10B. As shown in FIG. 10B, shutter 102 and shutter 104 may partially overlap in the closed position.

Noted in FIG. 10B is a position 160 of an apex of the lens of camera 108. Position 160 represents the horizontal, furthest-forward portion of camera 108 towards the front of system 100. Also noted in FIG. 10B is a position 162 of the approximate horizontal position of motor 148 and carriage nut 152 to be engaged with sliders of shutters 102, 104.

In one embodiment, placement of motors 148, carriage nuts 152, and other such elements at position 162 behind position 160 of the apex of camera 108 may facilitate innovative, space-effective design of system 100. The space between position 160 of the apex of the lens of camera 108 and the rear of cover 112 may be made as small as possible, through such a placement of motors 148 carriage nuts 152, and other such elements at positioning to the rear of position 160. This may best accommodate the fields of view of cameras 106, 108 without creating excessive massive structures around cameras 106, 108. The nature of camera field of view, and especially wide field of view for implementations such as that for camera 108, is that any increase, even a very small increase, in the spacing between the apex from the camera lens and cover 112 will result in a much greater proportionate size ratio for the surrounding mechanical features to house cameras 106, 108. Accordingly, to reduce the overall size of system 100, the implementations of shutters 102, 104 may be used. Inventors of embodiments of the present disclosure have discovered that other implementations and traditional shutter designs cause a significant size increase for system 100. For example, iris shutters require motor gearing that is within the same vertical plane as the shutter. This would cause a larger distance between the apex of the lens of the camera and the shutters and cover, causing a larger housing for the camera. Embodiments of the present disclosure including placement of motors 148, carriage nuts 152, and other such elements at position 162 behind position 160 of the apex of camera 108 may reduce the spacing between the apex of the lens of camera 108, shutters 102, 104, and cover 112 to avoid the associated growth in the width or height of system 100, which may grow to still accommodate the field of view of camera 108.

For example, a distance between a rear of cover 112 (which may include mask 114 for the purposes of this example) and a front of shutter 102 may be 0.48 mm. In one embodiment, shutter 102 and shutter 104 may slightly overlap for a vertical distance. There may be 0.25 mm between shutter 102 and shutter 104. There may be 0.35 mm between shutter 104 and an apex of the lens of camera 108.

Although example embodiments have been described above, other variations and embodiments may be made from this disclosure without departing from the spirit and scope of these embodiments.

We claim:

1. An apparatus, comprising:
   a first camera;
   a second camera positioned orthogonally adjacent to the first camera and oriented in a same direction as the first camera;
   a first shutter positioned horizontally in front of a lens of the first camera and configured to move orthogonally to a horizontal axis so as to fully obscure the lens of the first camera while partially obscuring a lens of the second camera when in a closed first shutter position; and
   a first motor positioned horizontally behind the front of the lens of the first camera, the first motor configured to move the first shutter orthogonally to the horizontal axis between the closed first shutter position and an open first shutter position.

2. The apparatus of claim 1, further comprising a second shutter positioned horizontally in front of a lens of the first camera and configured to partially obscure the lens of the second camera in a closed second shutter position.

3. The apparatus of claim 2, wherein a combination of the first shutter in the closed first shutter position and the second shutter in the closed second shutter position is configured to obscure the lens of the second camera.

4. The apparatus of claim 3, wherein the first shutter in the closed first shutter position and the second shutter in the closed second shutter position overlap horizontally in front of the lens of the second camera.

5. The apparatus of claim 2, further comprising a second motor positioned horizontally behind the front of the lens of the first camera, the second motor configured to move the second shutter orthogonally to the horizontal axis between the closed second shutter position and an open second shutter position.

6. The apparatus of claim 5, wherein the first motor and the second motor are configured to be operated independently.

7. The apparatus of claim 1, further comprising a first motor gearing positioned behind the front of the lens of the first camera, the first motor gearing configured to, with the first motor, move the first shutter orthogonally to the horizontal axis between the closed first shutter position and an open first shutter position.

8. The apparatus of claim 1, further comprising a first sensor positioned behind the front of the lens of the first camera, the first sensor configured to determine when the first shutter has reached the closed first shutter position.

9. The apparatus of claim 1, further comprising a slider coupled to the first shutter, the slider configured to extend horizontally towards a rear of the first camera, the slider including a protrusion configured to engage with a motor assembly at a location behind the front of the lens of the first camera.

10. An apparatus, comprising:
    a first camera;
    a second camera positioned orthogonally adjacent to the first camera and oriented in a same direction as the first camera; and
    a first shutter positioned horizontally in front of a lens of the first camera and configured to move orthogonally to a horizontal axis to:
      fully obscure the lens of the first camera while partially obscuring a lens of the second camera when in a closed first shutter position; and
      expose the lens of the first camera in an open first shutter position;
    wherein:
      the first shutter includes an open portion and a first solid portion;
      the open portion of the first shutter is configured to expose the lens of the first camera in the open first shutter position; and
      the first solid portion is configured to fully obscure the lens of the first camera in the closed first shutter position.

11. The apparatus of claim 10, wherein
    the first shutter further includes a second solid portion; and
    the second solid portion is configured to partially obscure the lens of the second camera in the closed first shutter position.

12. The apparatus of claim 10, further comprising a cover positioned horizontally in front of the first shutter, the cover including a transparent layer and an opaque mask, the opaque mask having a first opening, the first opening configured to expose the lens of the first camera;
    wherein a combination of the first opening of the opaque mask and the open portion of the first shutter is configured to expose the lens of the first camera in the open first shutter position.

13. The apparatus of claim 12, wherein the open portion of the first shutter is configured to be hidden behind the mask in the closed first shutter position.

14. The apparatus of claim 12, wherein the first solid portion of the first shutter is configured to be displayed through the first opening in the closed first shutter position.

15. The apparatus of claim 12, wherein the first solid portion of the first shutter is configured to be hidden behind the mask in the open first shutter position.

16. An apparatus, comprising:
- a first camera;
- a second camera positioned orthogonally adjacent to the first camera and oriented in a same direction as the first camera;
- a first shutter positioned horizontally in front of a lens of the first camera and configured to move orthogonally to a horizontal axis so as to fully obscure the lens of the first camera while partially obscuring a lens of the second camera when in a closed first shutter position;
- a second shutter positioned horizontally in front of a lens of the second camera and configured to move orthogonally to the horizontal axis so as to partially obscure the lens of the first second camera in a closed second shutter position;
- the first shutter includes a first portion of a first visual indicator, the first visual indicator configured to externally indicate that the first camera is unable to capture visual data;
- the second shutter includes a second portion of the first visual indicator; and
- when the first shutter is in the closed first shutter position and the second shutter is in the closed second shutter position, a combination of the first shutter and the second shutter are configured to externally display the first visual indicator.

17. The apparatus of claim 16, wherein when the first shutter is in an open first shutter position and the second shutter in an open second shutter position, the first visual indicator is not displayed.

18. The apparatus of claim 16, wherein:
- the first shutter further includes a second visual indicator;
- the second visual indicator configured to externally indicate that the second camera is unable to capture visual data;
- the first shutter is configured to partially obscure a lens of the second camera in the closed first shutter position; and
- when the first shutter is in the closed first shutter position, the first shutter is configured to externally display the second visual indicator.

* * * * *